US007969898B1

(12) United States Patent
Raj et al.

(10) Patent No.: US 7,969,898 B1
(45) Date of Patent: Jun. 28, 2011

(54) TECHNIQUE FOR BREAKING LOOPS IN A COMMUNICATIONS NETWORK

(75) Inventors: Alex Raj, Westford, MA (US); Robert H. Thomas, Lexington, MA (US); Anna Charny, Sudbury, MA (US); Prabhu Vaithilingam, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 11/716,055

(22) Filed: Mar. 9, 2007

(51) Int. Cl.
*H04L 12/26* (2006.01)

(52) U.S. Cl. ......... 370/248; 370/242; 370/249; 370/250

(58) Field of Classification Search .................. 370/225, 370/241–252
See application file for complete search history.

(56) References Cited

U.S. PATENT DOCUMENTS

| | | | | |
|---|---|---|---|---|
| 5,014,262 A * | 5/1991 | Harshavardhana | ........... | 370/237 |
| 6,163,525 A * | 12/2000 | Bentall et al. | ................ | 370/227 |
| 6,373,822 B1 | 4/2002 | Raj et al. | ....................... | 370/252 |
| 6,408,001 B1 | 6/2002 | Chuah et al. | .................. | 370/392 |
| 6,473,403 B1 * | 10/2002 | Bare | ............................ | 370/236 |
| 6,512,768 B1 | 1/2003 | Thomas | ....................... | 370/389 |
| 6,584,071 B1 | 6/2003 | Kodialam et al. | ............. | 370/238 |
| 6,628,649 B1 | 9/2003 | Raj et al. | ....................... | 370/360 |
| 6,665,273 B1 | 12/2003 | Goguen et al. | ................ | 370/252 |
| 6,665,305 B1 | 12/2003 | Weismann | .................... | 370/401 |
| 6,687,247 B1 | 2/2004 | Wilford et al. | ................ | 370/392 |
| 6,721,269 B2 | 4/2004 | Cao et al. | ...................... | 370/227 |
| 6,735,190 B1 | 5/2004 | Chuah et al. | .................. | 370/352 |
| 6,819,662 B1 * | 11/2004 | Grover et al. | ................. | 370/351 |
| 6,856,991 B1 | 2/2005 | Srivastava | ....................... | 707/10 |
| 6,879,594 B1 | 4/2005 | Lee et al. | ....................... | 370/408 |
| 6,895,441 B1 | 5/2005 | Shabtay et al. | ............... | 709/238 |
| 6,925,081 B2 | 8/2005 | Meda | ............................ | 370/392 |
| 6,950,398 B2 | 9/2005 | Guo et al. | ..................... | 370/235 |
| 6,952,421 B1 | 10/2005 | Slater | ............................ | 370/401 |
| 6,970,464 B2 | 11/2005 | Xu et al. | ........................ | 370/392 |
| 7,061,921 B1 | 6/2006 | Sheth | ....................... | 370/395.52 |
| 7,082,531 B1 * | 7/2006 | Chen et al. | .................... | 713/153 |
| 7,084,898 B1 | 8/2006 | Firestone et al. | .......... | 348/14.09 |
| 7,133,358 B2 | 11/2006 | Kano | ............................ | 370/221 |
| 7,289,622 B1 | 10/2007 | Liesenberg | .............. | 379/220.14 |
| 7,307,991 B2 | 12/2007 | Kubota et al. | ................. | 370/392 |
| 7,315,510 B1 | 1/2008 | Owens et al. | ................. | 370/218 |
| 7,388,828 B2 | 6/2008 | Nakash | ......................... | 370/218 |
| 2001/0034793 A1 | 10/2001 | Madruga et al. | .............. | 709/238 |
| 2002/0112072 A1 | 8/2002 | Jain | ................................ | 709/239 |
| 2002/0167895 A1 | 11/2002 | Zhu et al. | ...................... | 370/216 |

(Continued)

OTHER PUBLICATIONS

U.S. Appl. No. 11/203,801, filed Aug. 15, 2005, Raj, Alex, et al.

(Continued)

*Primary Examiner* — Thai D Hoang

(74) *Attorney, Agent, or Firm* — Brinks Hofer Gilson & Lione

(57) ABSTRACT

A technique for breaking a loop caused by looping alternate paths associated with a prefix in a communications network. One or more non-looping alternate paths associated with the prefix that exclude a first node in the communications network are identified. One or more alternate paths from nodes in the loop that are associated with the prefix are identified. An identified path that intersects with an identified non-looping path is established as an alternate path associated with the prefix at a node in the loop.

14 Claims, 16 Drawing Sheets

U.S. PATENT DOCUMENTS

| | | | |
|---|---|---|---|
| 2003/0063560 A1 | 4/2003 | Jenq et al. | 370/216 |
| 2004/0071080 A1 | 4/2004 | Uchiyama et al. | 370/225 |
| 2005/0018614 A1* | 1/2005 | Kiran | 370/252 |
| 2005/0088965 A1 | 4/2005 | Atlas et al. | 370/216 |
| 2005/0094636 A1 | 5/2005 | Lee et al. | 370/389 |
| 2005/0111351 A1 | 5/2005 | Shen | 370/217 |
| 2005/0163071 A1* | 7/2005 | Malladi et al. | 370/328 |
| 2005/0237927 A1 | 10/2005 | Kano et al. | 370/216 |
| 2005/0270972 A1 | 12/2005 | Kodialam et al. | 370/216 |
| 2006/0013127 A1 | 1/2006 | Izaiku et al. | 370/225 |
| 2006/0023628 A1* | 2/2006 | Uehara et al. | 370/232 |
| 2006/0034251 A1 | 2/2006 | Sivabalan et al. | 370/351 |
| 2006/0133282 A1* | 6/2006 | Ramasamy | 370/238 |
| 2006/0146696 A1 | 7/2006 | Li et al. | 370/218 |
| 2006/0159009 A1 | 7/2006 | Kim et al. | 370/216 |
| 2006/0159034 A1* | 7/2006 | Talur et al. | 370/254 |
| 2006/0239266 A1 | 10/2006 | Babbar et al. | 370/392 |
| 2007/0036072 A1* | 2/2007 | Raj et al. | 370/225 |
| 2007/0047467 A1* | 3/2007 | Enoki et al. | 370/254 |
| 2007/0174483 A1 | 7/2007 | Raj et al. | 709/238 |
| 2007/0201355 A1 | 8/2007 | Vasseur et al. | 370/217 |
| 2007/0286097 A1* | 12/2007 | Davies | 370/255 |
| 2008/0031130 A1 | 2/2008 | Raj et al. | 370/225 |
| 2008/0056137 A1* | 3/2008 | Ravindran et al. | 370/238 |

OTHER PUBLICATIONS

W. Luo et al., "Layer 2 VPN Architectures: Understanding Any Transport over MPLS", Cisco Systems, Inc., May 12, 2005, pp. 1-16.

"MPLS Traffic Engineering Fast Reroute-Link Protection", Cisco Systems, Inc., downloaded from www.cisco.com on Nov. 30, 2006, pp. 1-24.

E. Rosen et al., "Multiprotocol Label Switching Architecture", Request for Comments (RFC) 3031, Internet Engineering Task Force (IEFT), Jan. 2001, pp. 1-61.

L. Anderson et al., "LDP Specification", RFC 3036, IEFT, Jan. 2001, pp. 1-132.

Raj, A., Design and Analysis of a Fast Reroute Scheme for IP and MPLS Networks, Apr. 14, 2006, pp. 1-191, Submitted in Partial Fulfillment of the Requirements for the Degree of Doctor of Engineering in Electrical Engineering University of Massachusetts Lowell, USA.

Shen, Naimig, Chen, Enke, Tian, Albert, Discovering LDP Next-Nexthop Labels, dated May 2005, pp. 1-9, draft-shen-mpls-ldp-nnhop-label-02.txt.

Wijnands, IJsbrand, Thomas, Bob, Kamite, Yuji, Fukuda, Hitoshi, Multicast Extensions for LDP, dated Mar. 2005, pp. 1-12, draft-wijnands-mpls-ldp-mcast-ext-00.txt.

Bryant et al., draft-bryant-ipfrr-tunnels-01.txt, dated Oct. 2004, pp. 1-27, www.ietf.org.

Shand, M., draft-ietf-rtgwg-ipfrr-framework-02.txt, dated Oct. 2004, pp. 1-26, www.ietf.org.

Alia Atlas, Ed, draft-ietf-rtgwg-ipfrr-spec-base-01.txt, dated Mar. 2005, pp. 1-16, www.ietf.org.

Pan et al., draft-ietf-mpls-rsvp-lsp-fastreroute-05.txt, dated Nov. 2004, pp. 1-70, www.ietf.org.

* cited by examiner

TECHNIQUE FOR BREAKING LOOPS IN A COMMUNICATIONS NETWORK

BACKGROUND

A communications network is a geographically distributed collection of interconnected communication links used to transport data between nodes, such as computers. Many types of networks exist, with types ranging from local area networks (LANs) to wide-area networks (WANs). The nodes typically communicate by exchanging discrete packets or messages of data according to pre-defined protocols. In this context, a protocol comprises a set of rules defining how the nodes interact with each other.

Some communications networks employ various mechanisms to switch packets through the network from a source to a destination on a particular path. One such mechanism that may be employed is Multiprotocol Label Switching (MPLS). MPLS is a data-carrying mechanism that is designed to carry traffic (e.g., data packets) over a communications network from a source to a destination over paths, often called labeled-switched paths (LSPs).

The LSPs may include one or more intermediate nodes, such as routers or switches. As a packet travels from one intermediate node to the next, each intermediate node makes an independent forwarding decision for that packet. That is each intermediate node analyzes labels contained in the packet and determines where to forward the packet. Each intermediate node independently chooses a next hop for the packet based on its analysis of the packet's labels.

Choosing the next hop may be thought of as the composition of two functions. The first function partitions the entire set of possible packets into a set of Forwarding Equivalence Classes (FECs) wherein each FEC relates to a group of packets that are forwarded in the same manner (e.g., over the same path, with the same forwarding treatment). The second function maps each FEC to a next hop. Insofar as the forwarding decision is concerned, different packets which get mapped into the same FEC are typically indistinguishable. All packets which belong to a particular FEC and which travel from a particular node typically follow the same path.

In a typical MPLS network employing conventional Internet Protocol (IP) forwarding, a particular intermediate node may consider two packets to be in the same FEC if there is some address prefix (e.g., IP address) associated with a destination in that intermediate node's routing tables such that the prefix is the "longest match" for each packet's destination address. As the packet travels across the network, each hop in turn re-examines the packet and assigns it to an FEC.

In accordance with MPLS, the assignment of a particular packet to a particular FEC is typically done just once, as the packet enters the network. This assignment is typically performed by a label edge router (LER) which examines the prefix contained in the packet's network layer header and assigns an FEC to the packet based on this prefix. The FEC to which the packet is assigned is encoded as a short fixed length value known as a "label". When a packet is forwarded to its next hop in the LSP associated with the FEC, the label is sent along with it; that is, the packets are "labeled" before they are forwarded. At subsequent hops, there is no further analysis of the packet's network layer header. Rather, the label is used as an index into a table which specifies the next hop, and a new label. The old label is replaced with the new label, and the packet is forwarded to its next hop.

In an MPLS network, labels are often signaled to intermediate nodes in the network using a label-distribution protocol, such as the well-known Label Distribution Protocol (LDP). LDP uses a Label Mapping message (LDP advertisement message) to advertise labels associated with address prefixes.

Normally, an LDP advertisement message from an LDP speaker A to an LDP speaker B specifies a prefix (P) and the label (L) that speaker B is to use when forwarding labeled packets for P to speaker A. However, an LDP speaker may optionally include a path vector in the advertisement message to specify the path packets forwarded to an advertising node may take when labeled with L. The path vector usually comprises ID's that are used to identify each node on the path. Path vectors contain valuable topological information that a node may use to help learn a topology of the network.

LDP specifies the use of path vectors as part of an optional loop detection mechanism. The loop detection mechanism may also include a hop count in the LDP label messages. The hop count may specify how the path vector and hop count included in the messages are to be used to detect loops. For example, a hop count of zero may indicate an unknown hop count, and a message that includes a path vector with a zero hop count may indicate that the companion path vector does not specify the complete path to the destination.

A mechanism often referred to as Fast Reroute (FRR) may be used to quickly reroute traffic around a failed node or link in an MPLS network. In a typical FRR arrangement, a reroute decision associated with a failure, such as a failed link or node, is controlled locally by an intermediate node that interfaces with the failed link or node. Here, the intermediate node may detect the failure and, in response to the failure, switch traffic (packets) on an alternate path around the failed link or node. The alternate path may be identified by the intermediate node from path information (e.g., path vectors, hop counts) contained in advertisement messages, such as LDP advertisement messages, that are acquired by the intermediate node from other nodes in the network. In addition to forwarding the traffic on the alternate path, the intermediate node may also notify the head-end node associated with the traffic of the link failure. The head-end node may then attempt to establish a new LSP for the traffic that bypasses the failure, as described above.

As noted above, an LDP advertisement message may include path vectors and hop counts associated with prefixes. A node receiving the advertisement message may rely on topological information gleaned from path vectors contained therein to determine an alternate path for traffic associated with a prefix that may be used when a node or link associated with a next hop for the traffic fails. A label (Lr) is typically allocated for the prefix's routed path and another label (La) is typically allocated for the prefix's alternate path. When an intermediate node acquires an incoming packet labeled with the label Lr, it forwards the packet to the next hop on the prefix's routed path. When an intermediate node acquires a packet labeled with the label La it forwards the packet to the next hop on the prefix's alternate path.

LDP may be used to distribute labels associated with a prefix's routed path as well as its alternate path. Here, an intermediate node typically advertises routed path and alternate path labels associated with a prefix (P) according to a Label Advertisement Rule. An example of a Label Advertisement Rule is as follows:

(1) Advertise a routed path label (Lr) and the path vector for P's routed path (PVr) to its upstream neighbors for P; and (2) Advertise an alternate path label (La) and the path vector for P's alternate path (PVa) to its downstream neighbors for P.

BRIEF DESCRIPTION OF THE DRAWINGS

The foregoing and other objects, features and advantages of the techniques described herein will be apparent from the following more particular description of aspects of the techniques described herein, as illustrated in the accompanying drawings in which like reference characters refer to the same parts throughout the different views. The drawings are not necessarily to scale, with emphasis instead being placed upon illustrating the aspects, principles and concepts of the techniques described herein.

DETAILED DESCRIPTION

Illustrated aspects of the techniques described herein are described as using Multiprotocol Label Switching (MPLS) and the Label Distribution Protocol (LDP) to establish and maintain label-switched paths associated with prefixes as well as exchange information in a communications network. A version of MPLS that may be adapted for use with the techniques described herein is described in E. Rosen et al., "Multiprotocol Label Switching Architecture," Request For Comments (RFC) 3031, January 2001, which is available from the Internet Engineering Task Force (IETF). A version of LDP that may adapted for use with the techniques described herein is described in L. Andersson et al., "LDP Specification," RFC 3036, January 2001, which is also available from the IETF. It should be noted that other label-switching and label distribution techniques and protocols may be adapted to take advantage of the techniques described herein.

The selection of alternate paths may rely on topological information an intermediate node may glean from path vectors included in label advertisements received from its peers. The rules used for label advertisement, however, may limit the path information an intermediate node may learn from its neighbors and consequently an intermediate node may have an incomplete view of a network's topology when it selects its alternate path for a prefix. In some situations this may cause an intermediate node to select an alternate path that in combination with another alternate path selected by another intermediate node causes traffic to loop when there is a node failure. In MPLS Fast Reroute (FRR), such a loop is often called an FRR loop. FRR loops are undesirable because data traffic that enters a loop may not escape the loop and thus may not reach its destination.

The techniques described herein may be used in a communications network to break a loop caused by alternate paths. In accordance with an aspect of the techniques described herein, for a given prefix, one or more non-looping alternate paths that exclude a first node in the communications network are identified. The first node may be a node whose failure causes the loop. One or more alternate paths from nodes in the loop that are associated with the prefix are identified. An identified alternate path that intersects with an identified non-looping path is established as an alternate path for the prefix.

Figure 1:
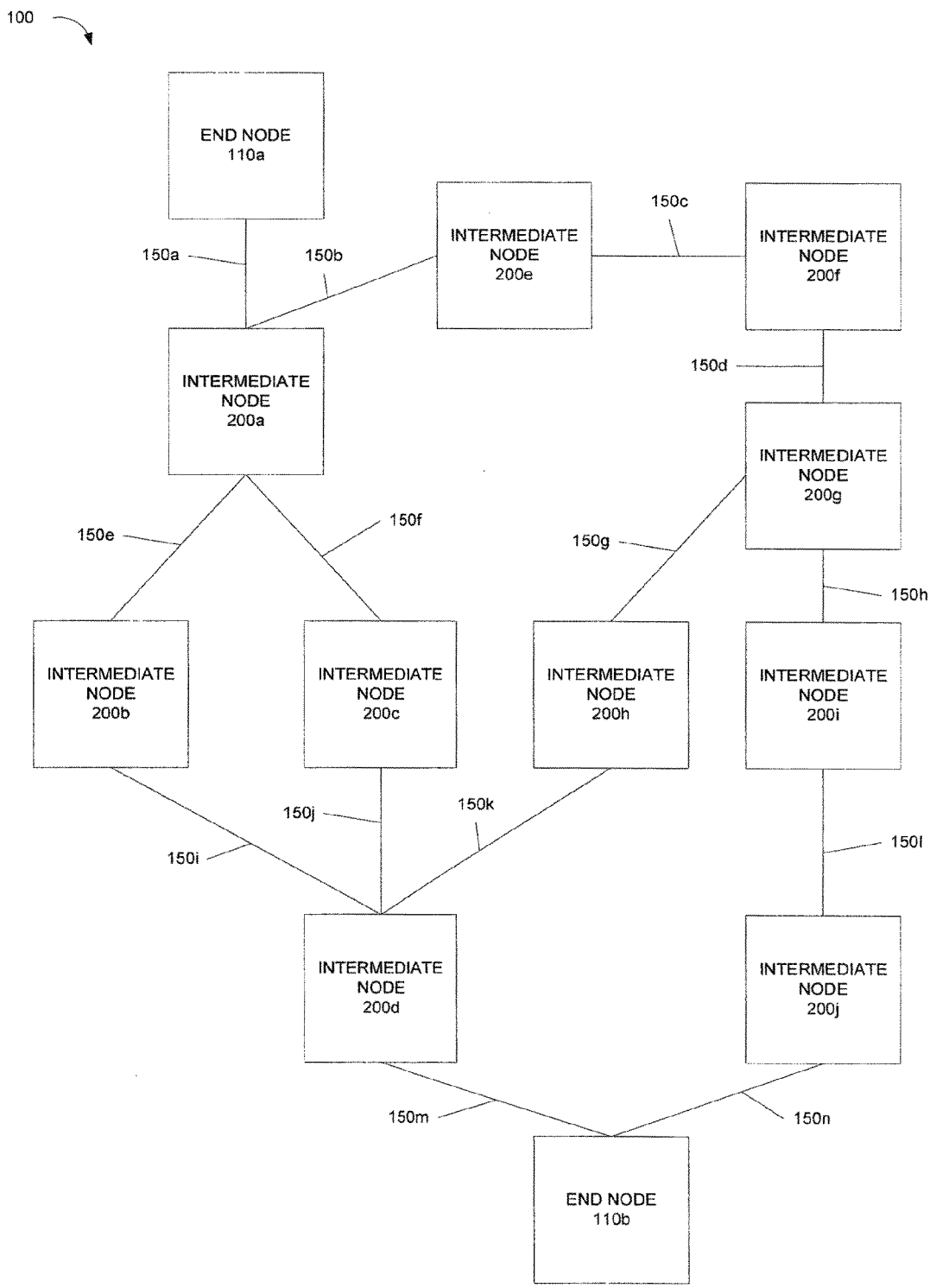
FIG. 1 is a block diagram of a communications network that may be used with the techniques described herein.

FIG. 1 is a block diagram of a communications network that may be used with the techniques described herein. The network comprises a collection of nodes including end nodes 110 and intermediate nodes 200 coupled via a series of links 150 to form an internetwork of nodes. These internetworked nodes communicate by exchanging information (e.g., data packets) according to a pre-defined set of network protocols and mechanisms, such as the Transmission Control Protocol/Internet Protocol (TCP/IP), MPLS and LDP. A protocol as used herein relates to a set of rules defining how nodes in a communications network interact with each other.

The end nodes 110 are illustratively conventional computer-based systems, such as personal computers (PCs), workstations, Personal Digital Assistants (PDAs) and the like, that are configured to generate information that is carried on the network 100. Alternatively, the end nodes 110 may be edge devices of e.g., an Internet Service Provider (ISP). The intermediate nodes 200 are conventional intermediate nodes, such as routers, switches and the like, that are configured to implement a label-switched network for carrying the information between nodes in the network 100.

Figure 2:
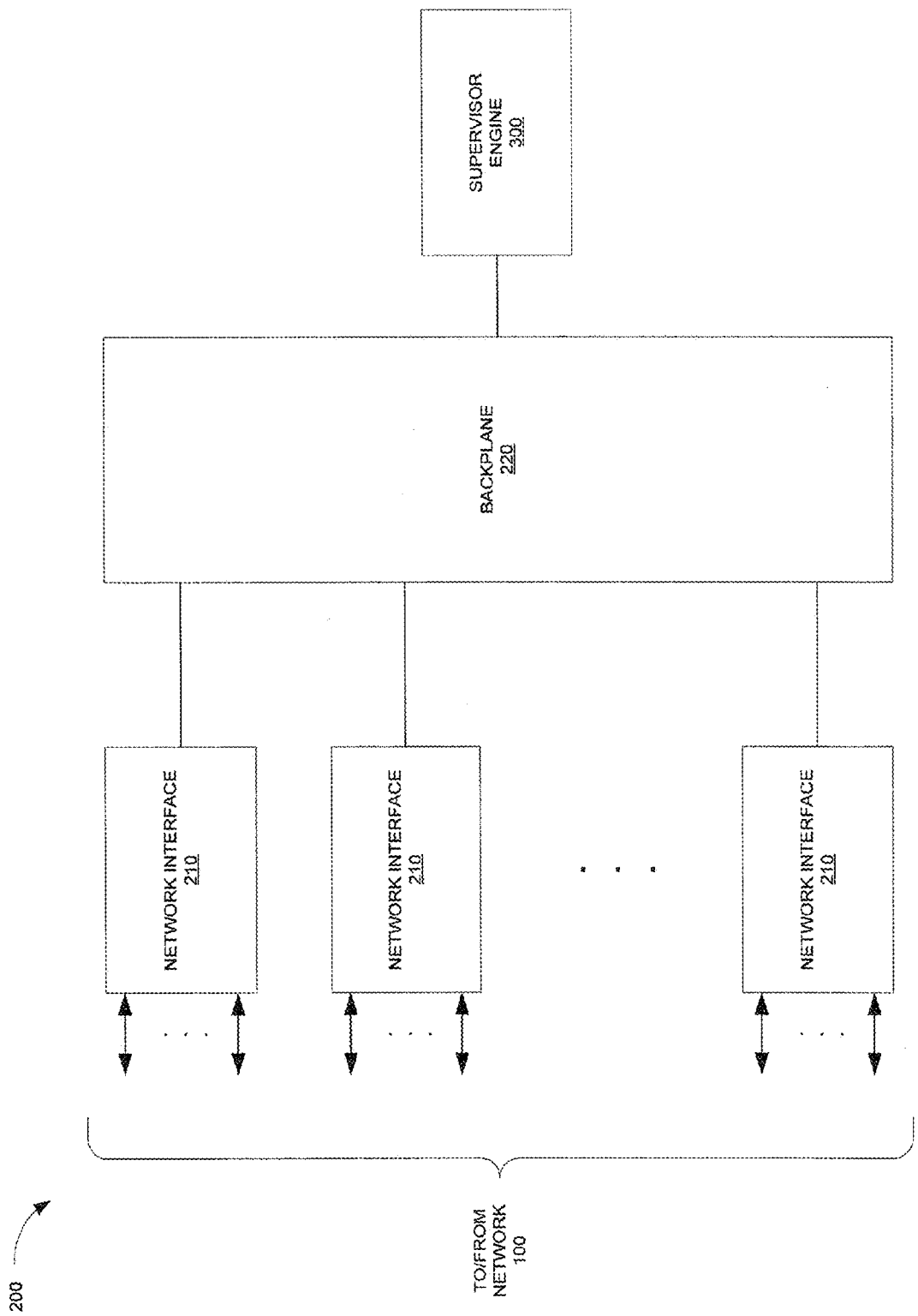
FIG. 2 is a block diagram of an intermediate node that may be used with the techniques described herein.

FIG. 2 is a block diagram of an example of an intermediate node 200, which is illustratively a router, that may be used with the techniques described herein. Suitable intermediate nodes that may be used with the techniques described herein include the Cisco 7600 Series Routers available from Cisco Systems Incorporated, San Jose, Calif. Intermediate node 200 comprises one or more network interface cards 210 and a supervisor engine card 300 interconnected by a backplane 220. Node 200 may be configured to perform, inter alia, label switching as well as various Layer-2 (L2) and Layer-3 (L3) switching and routing functions. In addition, node 200 may be configured to break a loop caused by alternate paths in accordance with the techniques described herein. As used herein, L2 and L3 refer to the data link layer and network layer, respectively, of the Open Systems Interconnection reference model (OSI-RM).

The backplane 220 comprises a point-to-point interconnect fabric that interconnects the cards and allows data and signals to be transferred between the cards. The network interface cards 210 are network interfaces configured to connect (interface) the intermediate node 200 with the network 100 and enable data packets to be transferred between the intermediate node 200 and the network 100 using various protocols such as, Asynchronous Transfer Mode (ATM), Ethernet and frame relay (FR). To that end, network interfaces 210 comprise conventional interface circuitry that may incorporate the signal, electrical and mechanical characteristics, and interchange circuits, needed to interface with the physical media and protocols running over that media.

The supervisor engine 300 comprises circuitry that, inter alia, may be configured to manage node 200, execute various protocols, such as Open Shortest Path First (OSPF), Intermediate System to Intermediate System (IS-IS) and MPLS, and perform other functions including detecting and breaking loops caused by looped alternate paths in accordance with aspects of the techniques described herein. It should be noted that functions performed by the supervisor engine 300 including functions that implement aspects of the techniques described herein may be performed by, e.g., processing circuitry contained on the network interface cards 210.

Figure 3:
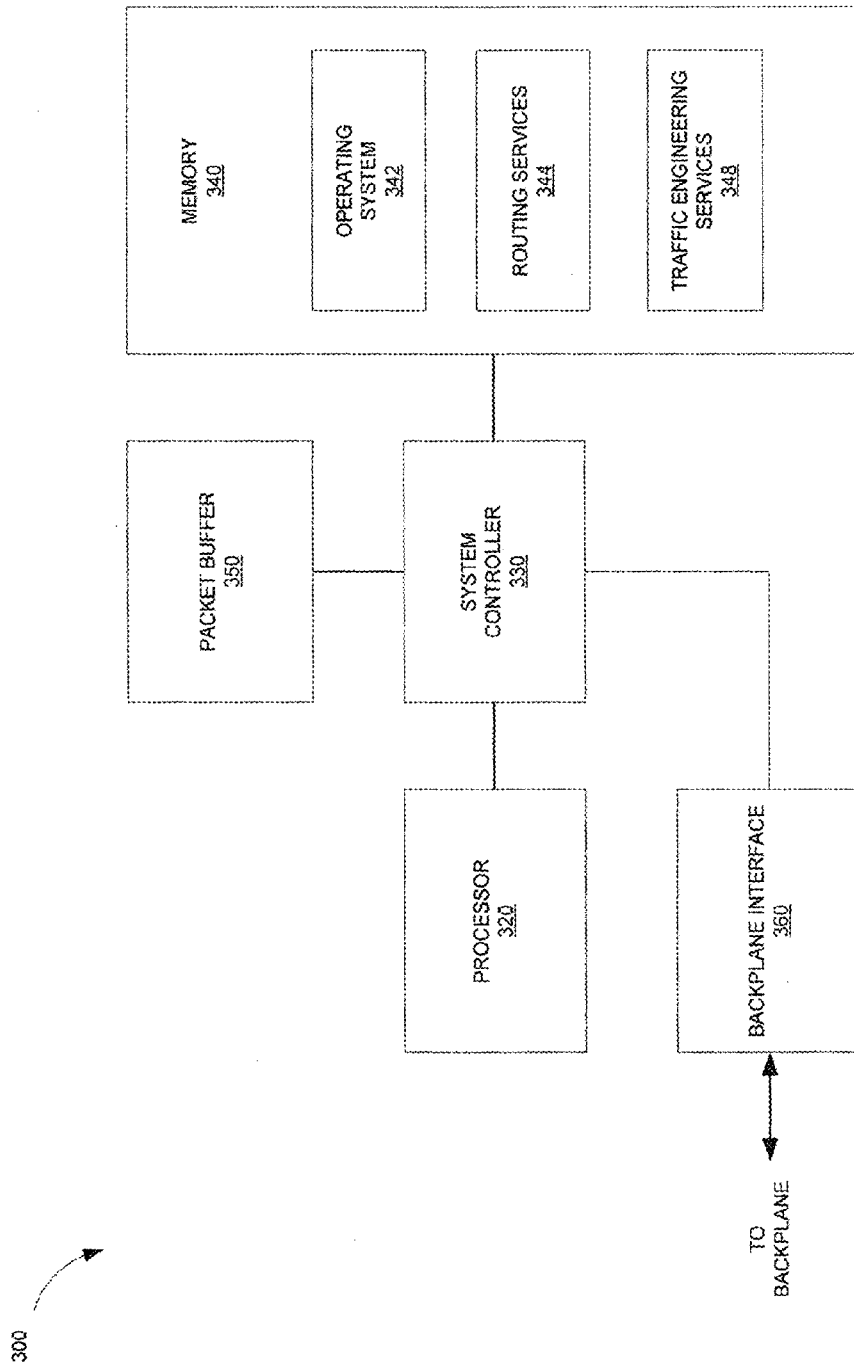
FIG. 3 is a block diagram of a supervisor engine that may be used with the techniques described herein.

FIG. 3 is a block diagram of an example of a supervisor engine 300 that may be used with the techniques described herein. Supervisor engine 300 comprises processing circuitry that illustratively includes a processor 320, system controller 330, packet buffer 350, backplane interface 360 and memory 340. The processor 320 is a conventional central processing unit (CPU) configured to execute instructions and access data contained in the memory 340 as well as access data contained in the packet buffer 350. System controller 330 is coupled to the processor 320, memory 340, packet buffer 350 and backplane interface 360 and comprises circuitry configured to enable data and control signals to be exchanged between these entities. Packet buffer 350 is a conventional packet memory comprising random access memory (RAM) devices capable of, e.g., storing packets acquired by the backplane interface 360 and processed by the processor 320. Backplane interface 360 comprises circuitry configured to interface the supervisor card 300 with the backplane 220 and enable data (e.g., packets) to be transferred between the backplane 220 and the supervisor engine 300.

Memory 340 is a computer-readable medium comprising one or more RAM devices, such as Dynamic RAM (DRAM) devices, that are configured to implement a RAM. Memory 340 contains software and data structures used by processor 320 including operating system 342, routing services 344 and traffic engineering (TE) services 348. Operating system 342 is a conventional operating system that contains computer-executable instructions configured to implement various operating system functions, such as controlling access to entities in intermediate node 200 as well as schedule various software processes and services, such as routing services 344 and TE services 348, for execution on the processor 320. Routing services 344 comprises computer-executable instructions configured to provide various conventional routing services performed by intermediate node 200. These services may include services configured to forward data packets as well as manage various data structures (not shown) used to forward the packets, such as routing tables and the like. TE services 348 comprises computer-executable instructions configured to implement a label-switching mechanism, such as MPLS, on node 200 to enable packets processed by node 200 to be switched on label-switched paths (LSPs). Moreover, TE services 348 comprises computer-executable instructions configured to break loops caused by looped alternate paths in accordance with aspects of the techniques described herein.

Functionally, packets are acquired from the network 100 via the network interface cards 210 which identify a destination for the packets. Packets destined for another card (e.g., network interface 210, supervisor engine 300) are transferred to the card via the backplane. Packets destined for a network interface card 210 may be further processed by the card 210 which may include transferring the packets onto the network 100. Packets destined for the supervisor engine 300 are acquired from the backplane 220 by interface 360 and placed in packet buffer 350 via system controller 330. Packets processed by the supervisor engine 300 that are destined for the network are transferred from packet buffer 350 via the system controller 330 to interface 360. Interface 360 transfers the packets via the backplane 220 to a network interface 210 which places the packets onto the network 100.

It should be noted that functions performed by the intermediate nodes 200, including functions that implement aspects of the techniques described herein, may be implemented in whole or in part using some combination of hardware and/or software. It should be further noted that computer-executable instructions and/or computer data that implement aspects of the techniques described herein may be stored in various computer-readable mediums, such as volatile memories, non-volatile memories, flash memories, removable disks, non-removable disks and the like. In addition, it should be noted that various electromagnetic signals, such as wireless signals, electrical signals carried over a wire, optical signals carried over optical fiber and the like may be encoded to carry computer-executable instructions and/or computer data that implement aspects of the techniques described herein on, e.g., a communications network.

As used herein, a prefix relates to an address, such as an IP address, that is associated with a destination. A destination may have more than one prefix associated with it. Also as used herein, a path relates to a path taken by traffic (e.g., data packets) from one point in a communications network to another point in the network. For example, referring to FIG. 1, traffic originating at end node 110a and associated with a particular prefix at end node 110b may travel along a path that includes intermediate nodes 200a, 200b and 200d, in that order. That is, traffic leaving node 110b is acquired by node 200a which forwards the traffic to node 200b. Node 200b acquires the traffic and forwards it to node 200d. Likewise, node 200d acquires the traffic and forwards it to node 110b which is the destination for the traffic. A path vector may be used to represent the path the traffic takes. The path vector typically contains a list of the nodes included in the path. For example, a path vector that represents the above path taken by traffic transferred from node 110a to 110b may be specified as {200a, 200b, 200d, 110b}.

Figure 4:
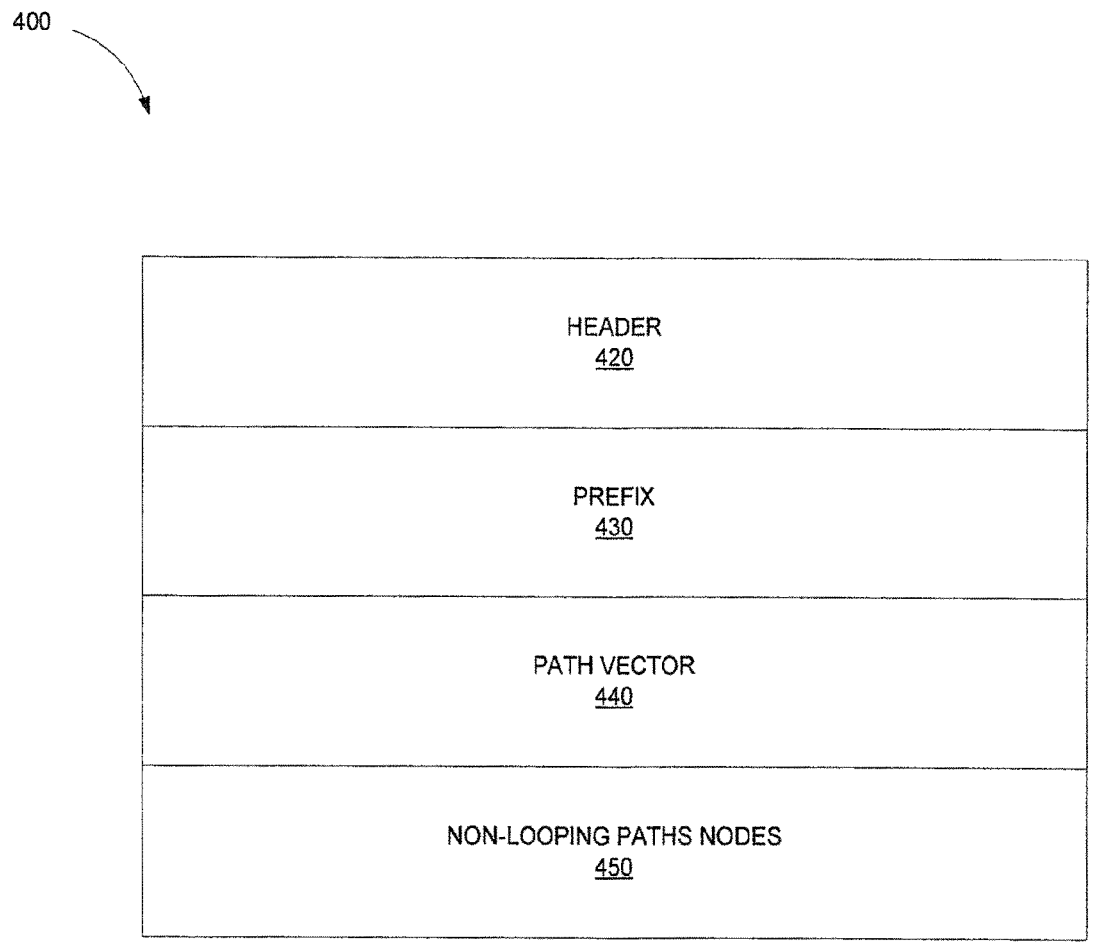
FIG. 4 illustrates an example of a loop break message that may be used with the techniques described herein.

As will be described further below, loop break messages are processed by nodes contained in a loop. FIG. 4 illustrates an example of a loop break message 400 that may be used with the techniques described herein. Message 400 comprises a header field 420, a prefix field 430, a path vector field 440 and a non-looping paths nodes field 450. The header field 420 is configured to hold information that may be used to route the message through the network to a destination. This information may include, for example, an IP address that is associated with the destination. The prefix field 430 is configured to hold a prefix associated with alternate paths that are causing a loop. The path vector field 440 is configured to hold a path vector associated with the loop. The non-looping paths nodes field 450 is configured to hold a list of nodes that are associated with path vectors of non-looping paths. As will be described further below, one of the non-looping paths may be used as a new alternate path for the prefix.

Figure 5:
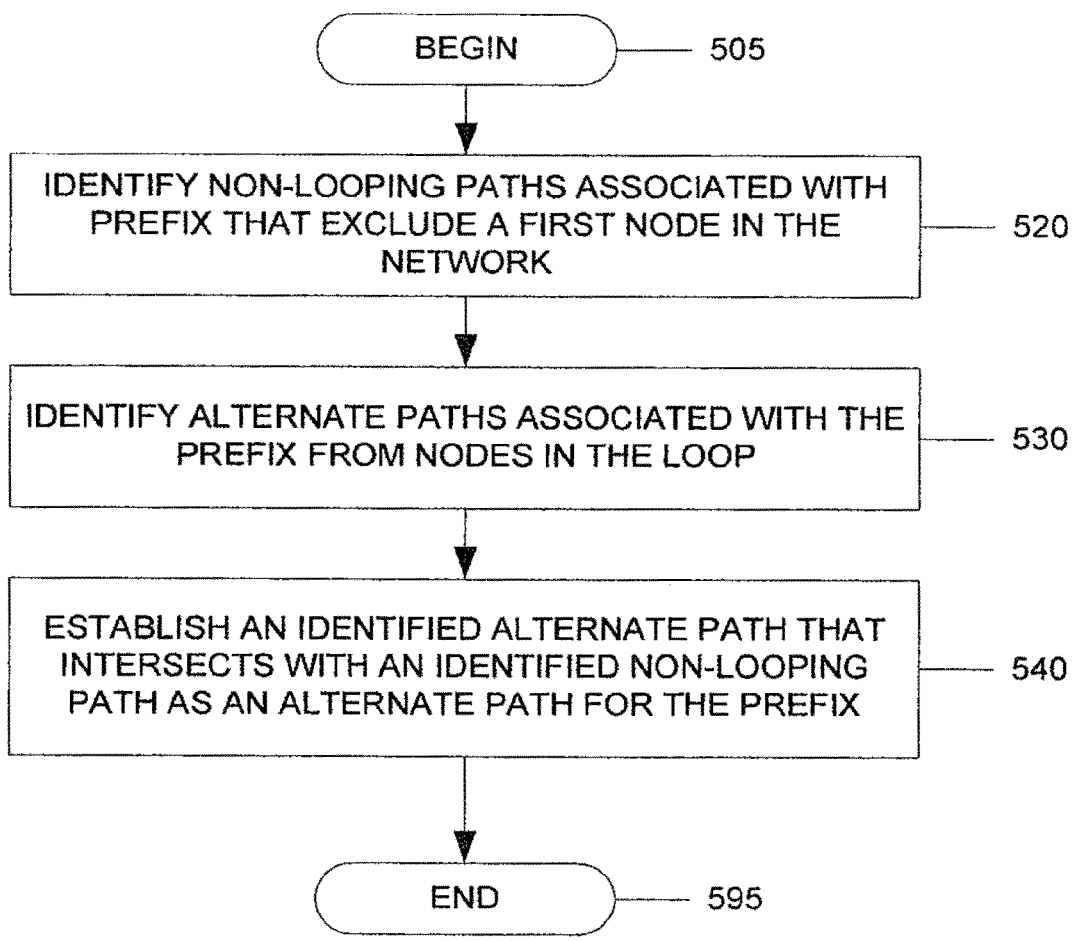
FIG. 5 is a flow chart of a sequence of steps that may be used in a communications network to break a loop caused by alternate paths in the network in accordance with an aspect of the techniques described herein.

FIG. 5 is a flow chart of a sequence of steps that may be used in a communications network to break a loop caused by alternate paths in the network in accordance with an aspect of the techniques described herein. Assume the alternate paths are associated with a prefix "P". The sequence begins at step 505 and proceeds to step 520 where non-looping paths associated with P that exclude a first node in the communications network are identified. Illustratively, the first node is a node in the network whose failure would cause the loop to occur. The paths may be identified from information contained in advertisements, such as LDP advertisement messages, associated with the prefix that are acquired by the first node from other nodes in the network. At step 530, alternate paths associated with the prefix from nodes contained in the loop are identified. Likewise, these paths may be identified from information contained in advertisements acquired by the first node from nodes contained in the loop.

At step 540, an above-identified alternate path that intersects with an above-identified non-looping path is established as an alternate path for the prefix. Here, a node may determine if an identified alternate path intersects with a non-looping path by determining if a node included in an identified alternate path is also included in an identified non-looping alternate path. If so, the node may conclude the identified alternate path intersects with the identified non-looping alternate path and the identified alternate path is established as an alternate path for the prefix. The sequence ends at step 595.

As will be described further below, in accordance with an aspect of the techniques described herein, a node not contained in the loop may make the determination that an identified alternate path provided by a node in the loop intersects with an identified non-looping path and direct the node in the loop that provided the identified alternate path to establish the identified alternate path as an alternate path for the prefix. In accordance with another aspect of the techniques described herein, as will also be described further below, a node in the loop may make the determination that one of its alternate paths for the prefix intersects with a non-looping alternate path and establish its intersecting alternate path as an alternate path for the prefix.

Note that if two or more identified alternate paths intersect with non-looping paths, a selection rule may be used to select the alternate path that is established as the alternate path for the prefix. An example of an alternate path selection rule that may be used is as follows:

Let U be a set of the above-identified intersecting path vectors associated with the prefix "P";
Let C be a subset of U which merges with a routed path associated with the prefix nearest in hops to the destination (D);
The alternate path for P is the shortest path vector in C.

FIGS. 6A-D are a flow chart of a sequence of steps that may be used in a communications network to detect a loop caused by alternate paths associated with a prefix "P" at a first node in the network in accordance with an aspect of the techniques described herein. The sequence begins at step 605 and proceeds to step 610 where the first node generates a first set containing path vectors that represent alternate paths for P from nodes that are upstream from the first node. The path vectors contained in the first set may be generated from information contained in advertisement messages that are sent by the upstream nodes to the first node. At step 612 a check is performed to determine if the first node appears in more than one of the path vectors in the first set. If not, the sequence proceeds to step 614 where the first node concludes that no loops exist in the alternate paths represented by the path vectors in the first set, and step 695 (FIG. 6D) where the sequence ends.

Figure 6A:
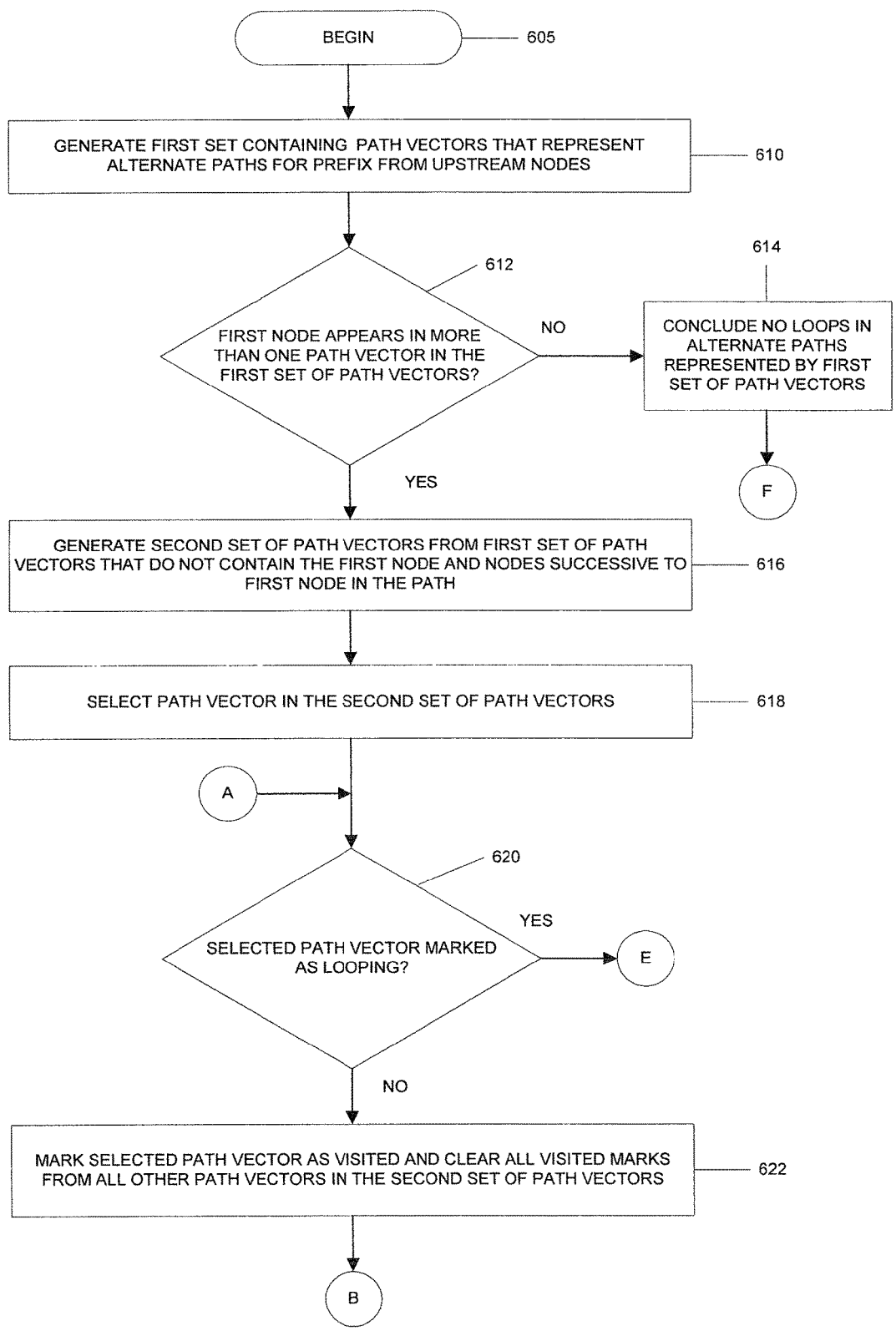
FIGS. 6A-D are a flow chart of a sequence of steps that may be used to detect a loop caused by looped alternate paths in a communications network in accordance with an aspect of the techniques described herein.
Figure 6B:
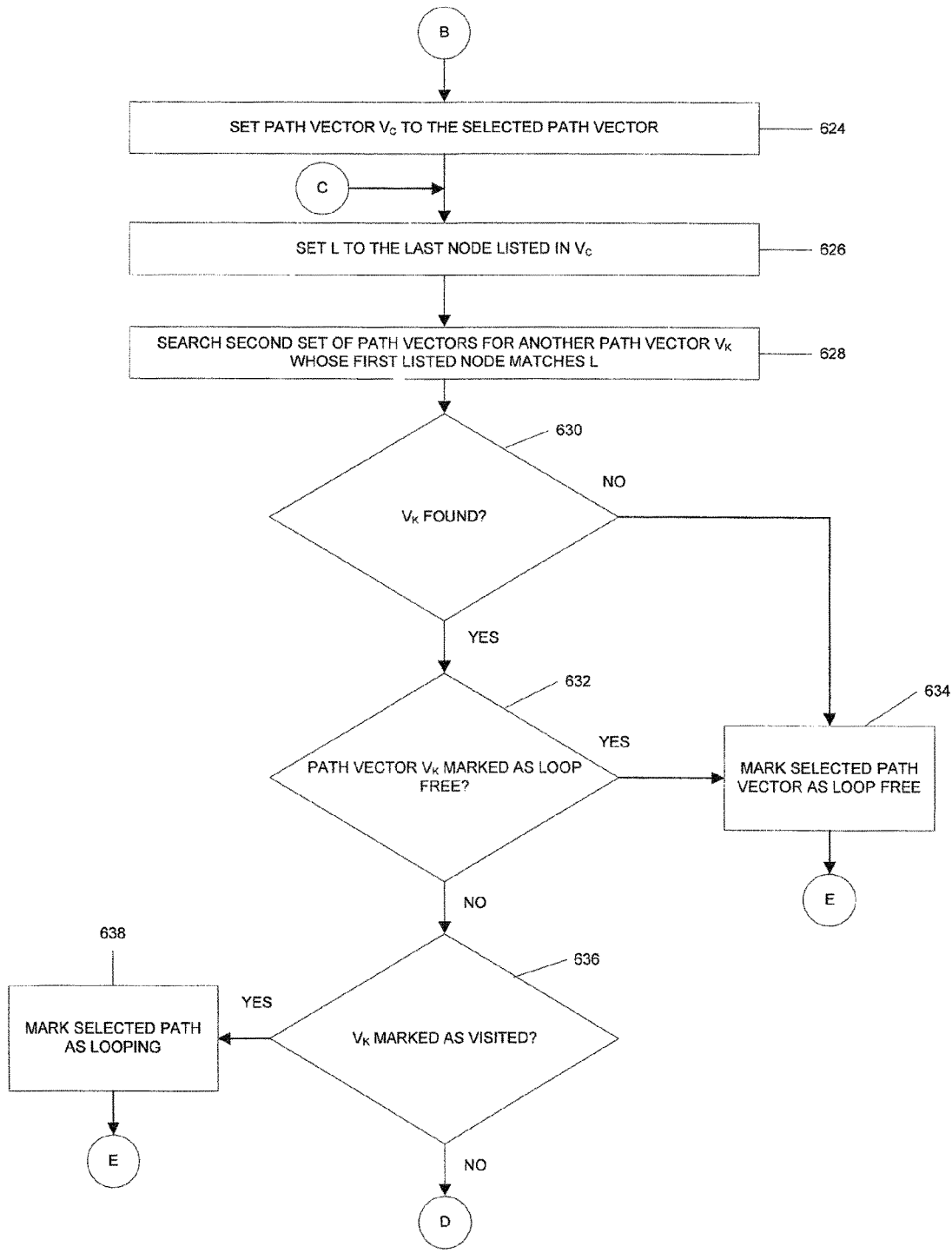
Figure 6C:
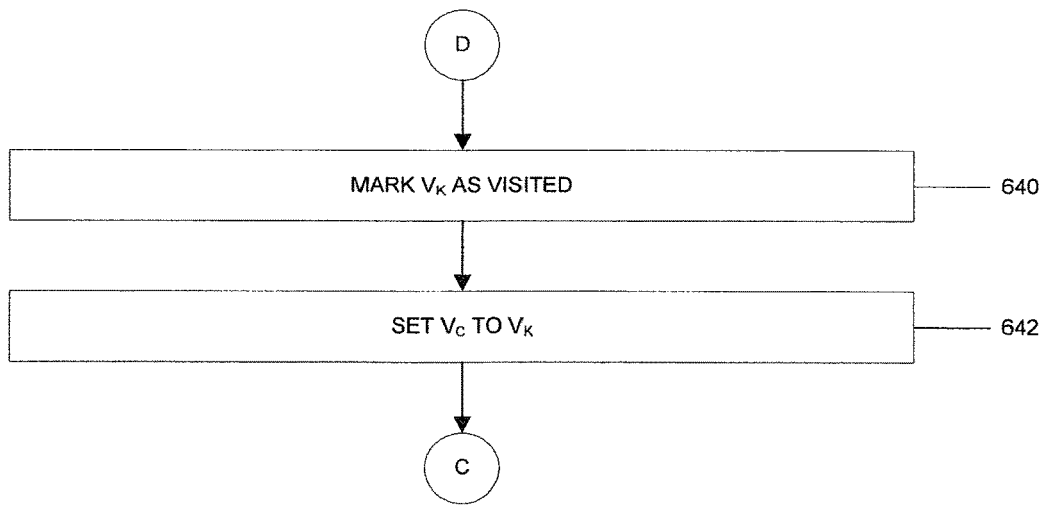
Figure 6D:
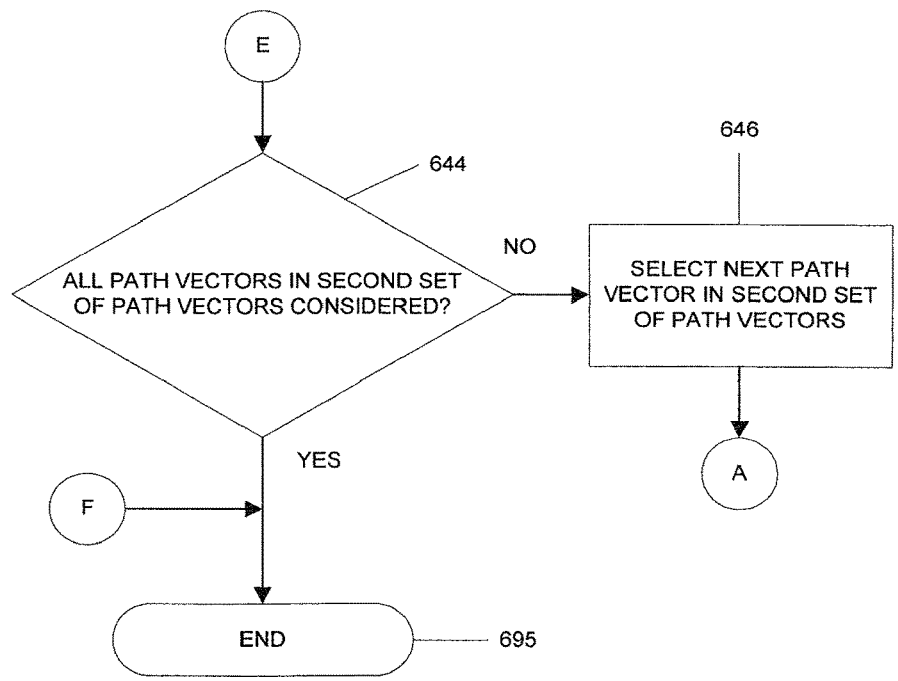

Otherwise, if at step 612 the first node determines that it appears in more than one path vector in the acquired set of path vectors, the sequence proceeds to step 616 where a second set containing path vectors that do not include the first node and nodes successive to the first node along the paths represented by the path vectors is generated from the first set of path vectors. The sequence proceeds to step 618 where a path vector in the second set of path vectors is selected. At step 620, a check is performed to determine if the selected path vector has been marked as looping. If so, the sequence proceeds to step 644 (FIG. 6D). Otherwise, the sequence proceeds to step 622 where the selected path vector is marked as being visited and all visited marks from other path vectors in the second set of path vectors are cleared.

At step 624 (FIG. 6B), a path vector "$V_C$" is set to the selected path vector. At step 626, a value "L" is set to the last node listed in $V_C$. Next at step 628, a search is performed on the second set of path vectors to determine if a path vector ($V_K$) whose first listed node matches L exists in the second set of path vectors. At step 630 a check is performed to determine if $V_K$ exists. If not, the sequence proceeds to step 634 where the selected path vector is marked as loop free. The sequence proceeds to step 644.

If at step 630 it is determined $V_K$ was exists, the sequence proceeds to step 632 where a check is performed to determine if $V_K$ has been marked as loop free. If so, the sequence proceeds to step 634. Otherwise, the sequence proceeds to step 636 where a check is performed to determine if path vector $V_K$ has been marked as visited. If so, the sequence proceeds to step 638 where the selected path is marked as looping. The sequence proceeds to step 644. If at step 636 it is determined that $V_K$ has not been marked as visited, the sequence proceeds to step 640 (FIG. 6C), where $V_K$ is marked as visited. The sequence proceeds to step 642 where the path vector $V_C$ is set to the path vector $V_K$ and the sequence returns to step 626.

At step 644, a check is performed to determine if all the path vectors in the second set of path vectors have been considered. If not, the sequence proceeds to step 646 where the next path vector in the second set of path vectors is selected. The sequence returns to step 620. If at step 644 all of the path vectors in the second set of path vectors have been considered, the sequence proceeds to step 695. At this point, the path vectors contained in the second set of path vectors will either been marked as either "looping" or "loop free". The path vectors marked as "looping" contain loops whereas those marked as "loop free" do not.

For example, referring to FIGS. 1 and 6A-D, assume that a path vector for a routed path for a prefix "P" from end node 110a to end node 110b is {200a, 200b, 200d, 110b}. Further, assume that a path vector for an alternate path for P at node 200b is {200a, 200c, 200d, 110b} and that a path vector for an alternate path for P at node 200c is {200a, 200b, 200d, 110b}. As can be seen by these path vectors, a loop exists between intermediate nodes 200b and 200c on the alternate paths. Should intermediate node 200d fail, traffic for prefix P would be caught in the loop. Specifically, intermediate node 200b, on detecting a failure with intermediate node 200d, routes traffic destined for P on its alternate path which causes the traffic to travel to node 200c via node 200a. Node 200c, in turn, would likewise detect that node 200d has failed and route the traffic for P on its alternate path which would route the traffic to node 200b via node 200a and so on.

Node 200d may detect the loop in accordance with the above described technique as follows. Intermediate node 200d generates a first set containing alternate path vectors that represent the alternate paths for P from the upstream nodes 200b and 200c (step 610). Assume the first set of path vectors is {{200b, 200a, 200c, 200d, 110b}, {200c, 200a, 200b, 200d, 110b}}. Node 200d examines the acquired path vectors and determines if node 200d appears in more than one path vector (step 612). Since in this example node 200d appears in more than one of the acquired path vectors, node 200d generates a second set of path vectors from this first set of path vectors wherein the second set of path vectors do not contain node 200d and nodes successive to the node 200d in the path vector (step 616). Assume the second set of path vectors is {{200b, 200a, 200c}, {200c, 200a, 200b}}. Node 200d selects first path vector in the second set of path vectors. Assume that node 200d selects the first path vector in the second set of path vectors which is {200b, 200a, 200c}.

Next, node 200d checks the selected path vector to determine if it has been marked as looping (step 620). Since, at this point, none of the path vectors have been marked as looping, node 200d concludes that the path vector has not been marked as looping, marks the selected path vector as visited and clears all visited marks associated with other path vectors in the second set of path vectors (step 622). Node 200d sets $V_C$ to the selected path vector (step 624). Assume $V_C$ is set to {200b, 200a, 200c}. Next, node 200d sets L to the last element in $V_C$ (step 626). Assume L is set to 200c. Node 200d searches the second set of path vectors for another path vector $V_K$ whose first element matches L (step 628). Assume $V_K$ is {200c, 200a, 200b}.

Next, node 200d performs a check to determine if $V_K$ was found (step 630). Since, as noted above $V_K$ has been found, node 200d determines if $V_K$ is marked as loop free (step 632). Assuming $V_K$ has not been marked as loop free, node 200d determines if $V_K$ is marked as visited (step 636). Assuming that $V_K$ is not marked as visited, node 200d marks $V_K$ as visited and sets $V_C$ to $V_K$ (step 642). Assume $V_C$ is set to {200c, 200a, 200b}.

Node 200d sets L to the last node listed in $V_C$ (step 626). Assume L is set to 200b. Node 200d searches the second set of path vectors for another path vector $V_K$ whose first element matches L (step 628). Assume $V_K$ is {200b, 200a, 200c}. Node 200d performs a check to determine if $V_K$ was found (step 630). Since, as noted above $V_K$ has been found, node 200d determines if $V_K$ is marked as loop free (step 632). Assuming $V_K$ has not been marked as loop free node 200d determines if $V_K$ is marked as visited (step 636). Since, as noted above, $V_K$ has been marked as visited, node 200d marks the selected vector as looping (step 638). The above is repeated for the next vector in the second set of path vectors which in this example is {200c, 200a, 200b} and node 200d concludes that this path vector is looping as well. Thus, a loop between alternate paths represented by the path vectors {200b, 200a, 200c} and {200c, 200a, 200b} has been detected.

Figure 7A:
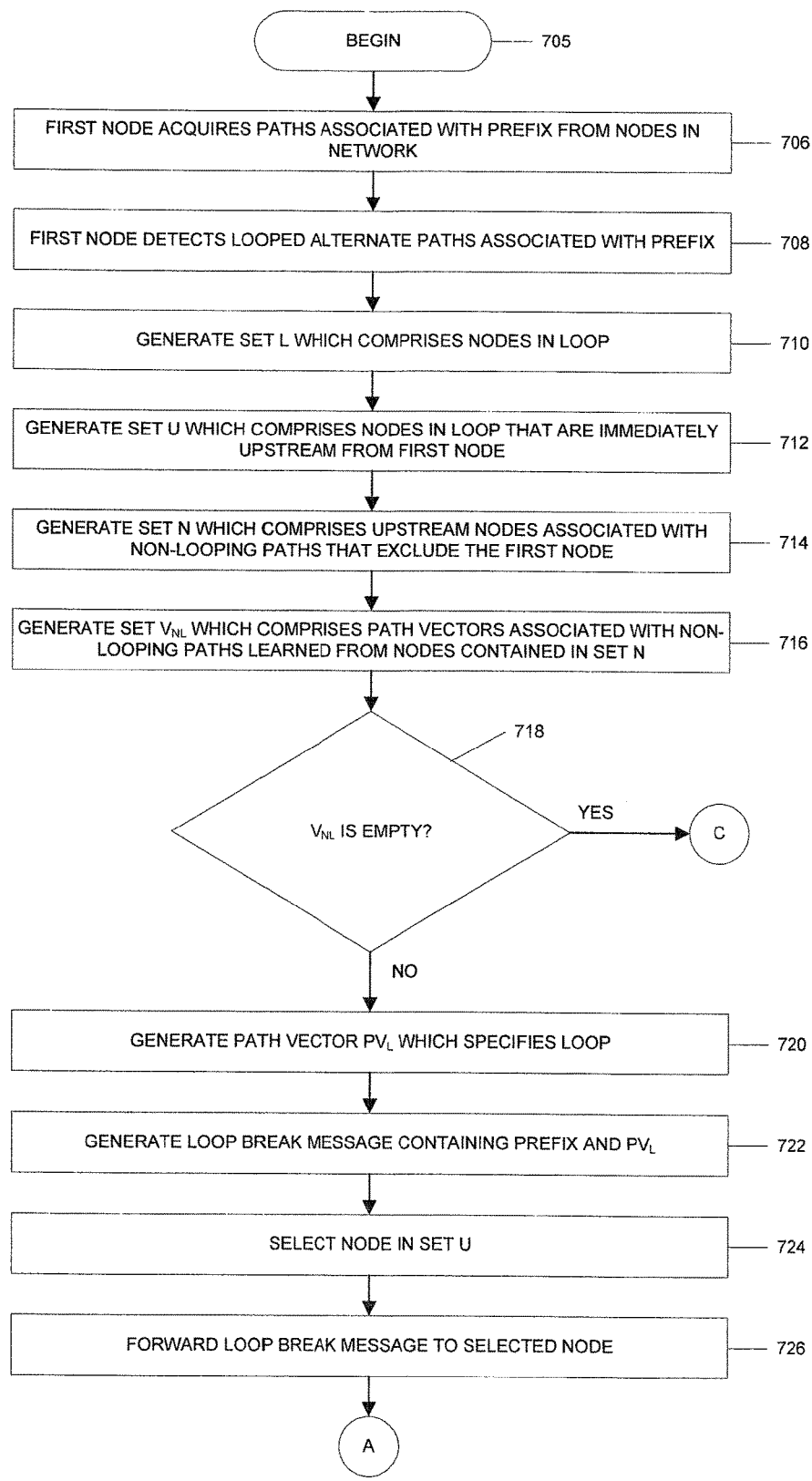
FIGS. 7A-C are a flow chart of a sequence of steps of a centralized technique that may be used in a communications network to break a loop caused by looped alternate paths associated with a prefix in the network in accordance with an aspect of the techniques described herein.
Figure 7B:
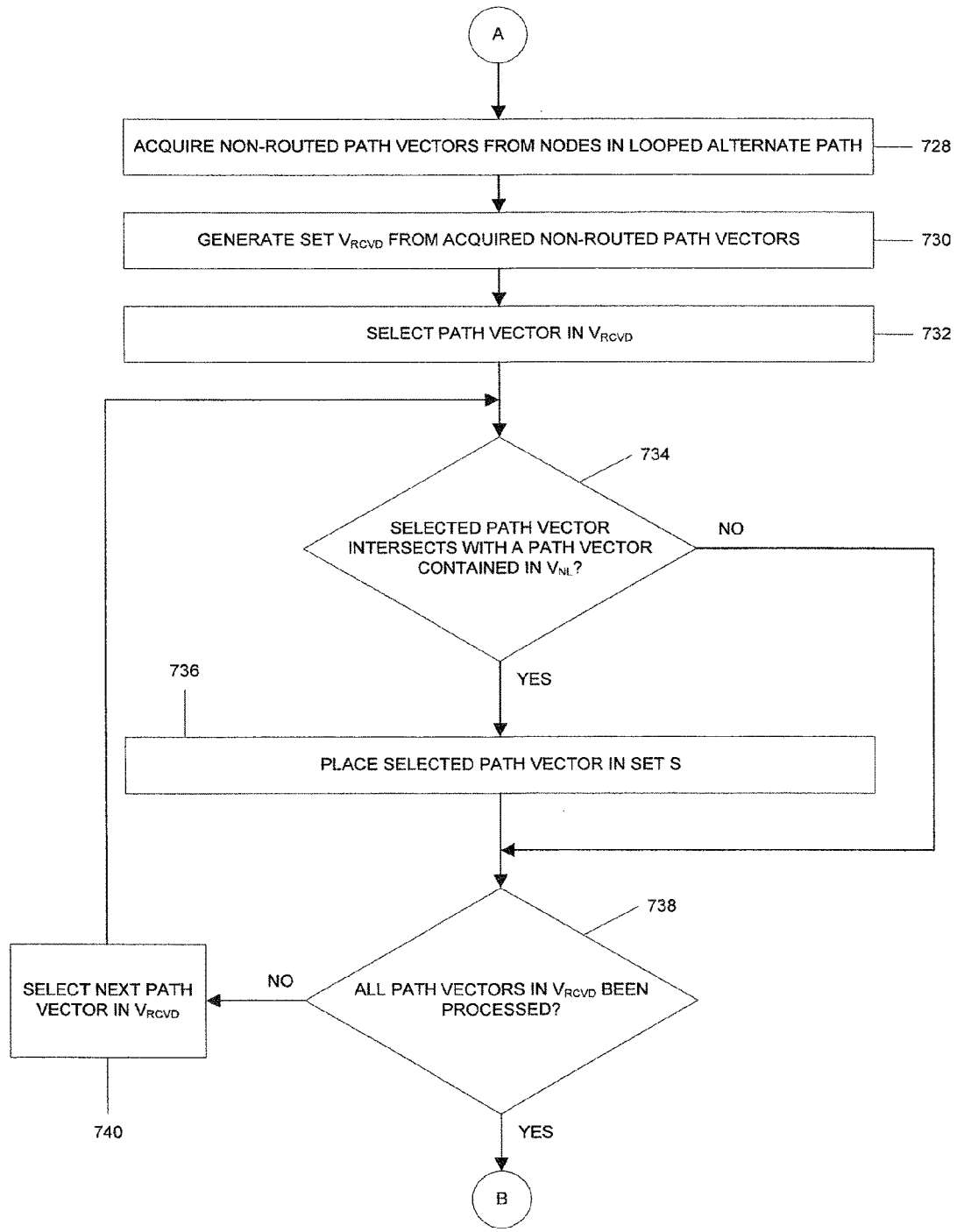
Figure 7C:
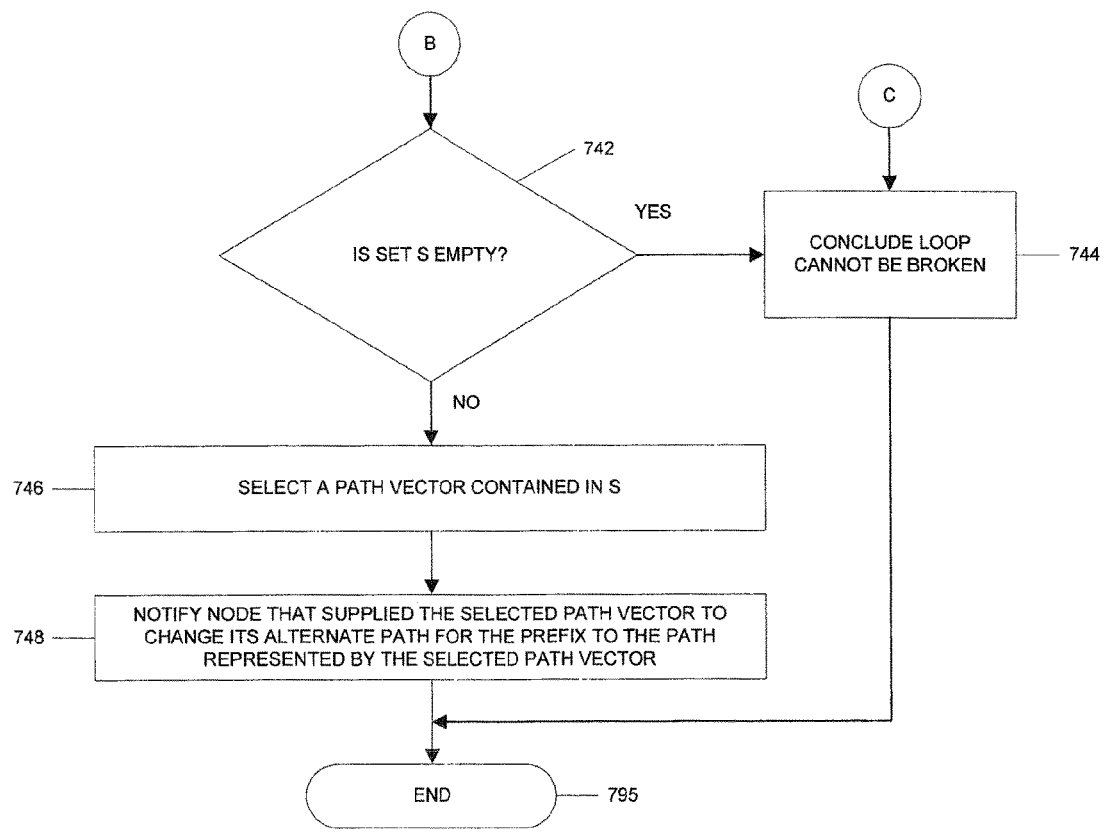

FIGS. 7A-C are a flow chart of a sequence of steps of a centralized technique that may be used in a communications network to break a loop caused by alternate paths in the network in accordance with the techniques described herein. Assume the alternate paths are associated with a prefix "P". The sequence begins at step 705 and proceeds to step 706 where a first node in the network acquires paths associated with P from other nodes in the network. These paths may include routed paths as well as alternate paths associated with the prefix that were chosen by the nodes. The paths may be acquired from information contained in advertisement messages, such as LDP advertisement messages, acquired by the first node from other nodes in the network. At step 708, the first node detects the loop using the acquired path information, illustratively as described above. At step 710, a set L comprising nodes that are in the loop is generated. At step 712, a set U comprising nodes in the loop that are immediately upstream to the first node is generated. At step 714, a set N, comprising upstream nodes associated with non-looping paths for P that exclude the first node, is generated. At step 716 a set $V_{NL}$ comprising path vectors associated with the non-looping paths associated with P that were learned from nodes contained in set N is generated. At step 718 a check is performed to determine if set $V_{NL}$ is empty. If so, the sequence proceeds to step 744 (FIG. 7C) where the first node concludes that the loop cannot be broken. The sequence then proceeds to step 795 where the sequence ends.

If at step 718 if it is determined that $V_{NL}$ is not empty, the sequence proceeds to step 720 where a path vector $PV_L$ comprising nodes in the loop is generated. Next, at step 722, a loop break message containing P and the path vector $PV_L$ is generated. At step 724, a node in set U is selected. Illustratively, the node that is selected is the first node listed in set U. Next, at step 726, the loop break message is forwarded to the selected node. As will be described further below with respect to FIG. 8, each node in the loop acquires and processes the loop break message. This processing illustratively includes forwarding path vectors associated with non-routed paths for P (non-routed path vectors) to the first node.

At step 728 (FIG. 7B), the first node acquires non-routed vectors forwarded by the nodes in the loop and, at step 730, generates a set $V_{RCVD}$ containing the acquired non-routed path vectors. At step 732, a path vector contained in $V_{RCVD}$ is selected. At step 734, a check is performed to determine if the selected path vector intersects with a path vector contained in $V_{NL}$. If not, the sequence proceeds to step 738. Otherwise, the sequence proceeds to step 736 where the selected path vector is placed in a set S. At step 738, a check is performed to determine if all of the path vectors in set $V_{RCVD}$ have been processed. If not, the sequence proceeds to step 740 where another path vector in $V_{RCVD}$ is selected for processing. The sequence then returns to step 734.

If at step 738 all of the path vectors in $V_{RCVD}$ have been processed, the sequence proceeds to step 742 (FIG. 7C) where a check is performed to determine if the set S is empty. If so, the sequence proceeds to step 744. Otherwise, if set S is not empty, the sequence proceeds to step 746 where a path vector contained in S is selected. Here, the above-described alternate path selection rule may be used to select the path vector. At step 748, the node that supplied the selected path vector is notified to change its alternate path for P to the selected path vector. The sequences ends at step 795.

Figure 8:
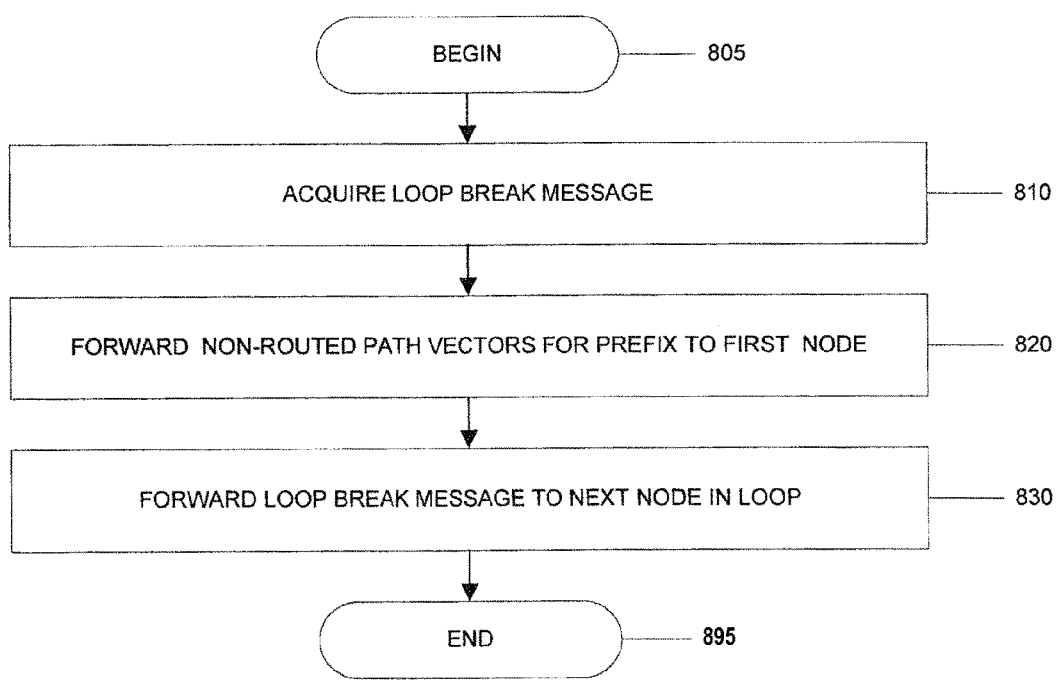
FIG. 8 is a flow chart of a sequence of steps that may be used in a communications network to process a loop break message utilized in a centralized technique for breaking a loop in accordance with an aspect of the techniques described herein.

FIG. 8 is a flow chart of a sequence of steps that may be used to process the above-described loop break message at a node in the loop in accordance with an aspect of the techniques described herein. The sequence begins at step 805 and proceeds to step 810 where the loop message is acquired by the node in the loop. At step 820, non-routed path vectors associated with P are forwarded to the node that generated the loop break message. These path vectors may include alternate path vectors for P that are known to the node in the loop. At step 830, the loop break message is forwarded to the next node in the loop. The sequence ends at step 895.

Referring to FIGS. 1, 7A-C and 8, assume, for example, that a loop exists on the above described alternate paths between nodes 200b and 200c for the prefix "P". Further assume that node 200d has acquired path information associated with routed and alternate paths for P from nodes in the network (step 706) and has detected the loop (step 708), as described above. In accordance with the techniques described herein, node 200d generates a set L which comprises the nodes contained in the loop (step 710). Assume L is the set {200b, 200a, 200c}. Next, node 200d generates a set U which comprises nodes in the loop that are immediately upstream from intermediate node 200d (step 712). Assume U is the set {200b, 200c}. Node 200d generates a set N which comprises upstream nodes associated with non-looping paths associated with P that exclude node 200d (step 714). Assume set N is the set {200h}. Node 200d generates a set $V_{NL}$ which comprises non-looping path vectors associated with non-looping paths learned from nodes contained in set N (step 716). Assume set $V_{NL}$ is the set {{200h, 200g, 200i, 200j, 110b}}.

Node 200d determines if set $V_{NL}$ is empty (step 718). Since as noted above set $V_{NL}$ comprises an element and therefore is not empty, thus, node 200d generates a path vector $PV_L$ which specifies the loop (step 720). Assume $PV_L$ is the path vector {200b, 200a, 200c}. Node 200d illustratively generates a loop break message 400 containing P in the prefix field 430 and $PV_L$ in the path vector field 440 (step 722). Node 200d selects a node in set U (step 724) and forwards the loop break message 400 to the selected node (step 726). Assume node 200d selects node 200b and forwards the loop break message 400 to node 200b.

Node 200b acquires the loop break message 400 (step 810) and forwards non-routed path vectors associated with P to node 200d (step 820). Assume the path vectors that node 200b forwards to node 200d includes the path vector {200a, 200c, 200d, 110b}. Node 200b forwards the loop break message 400 to the next node (step 730) which in this example is node 200a. This process is repeated by the remaining nodes in the loop. Assume that the path information reported by the remaining nodes include the path vectors {200c, 200d, 110b} and {200e, 200f, 200g, 200h, 200d, 110b} from node 200a and, {200a, 200b, 200d, 110b} from node 200c.

Returning to FIG. 7B, node 200d acquires the path vectors from the nodes in the loop (step 728) and generates a set $V_{RCVD}$ from the acquired path information (step 730). Assume $V_{RCVD}$ comprises {{200a, 200c, 200d, 110b}, {200c, 200d, 110b}, {200e, 200f, 200g, 200h, 200d, 110b}, {200a, 200b, 200d, 110b}}. Node 200d selects an element in $V_{RCVD}$ (step 732). Assume {200a, 200c, 200d, 110b} is selected. Next, node 200d determines if the selected element intersects with a path vector contained in $V_{NL}$ (step 734). Assume in this case the selected element does not intersect with a path vector contained in $V_{NL}$. Node 200d performs a check to determine if there are more elements in $V_{RCVD}$ to process (step 738). Since there are more elements in $V_{RCVD}$ to process the node 200d selects the next element in $V_{RCVD}$ (step 740) and repeats the above on this element. Assume that after the above is repeated for all of the elements contained in $V_{RCVD}$ that S contains {{200e, 200f, 200g, 200h, 200d, 110e}}.

Node 200d determines if set S is empty (step 742). Since as noted above set S contains an element, node 200d concludes that set S is not empty and selects a path vector contained in the set (step 746). Assume the selected path vector is {200e, 200f, 200g, 200h, 200d, 110e} which was supplied by node 200a. Node 200d notifies node 200a to change its alternate path for P to the selected path vector (step 748).

Figure 9A:
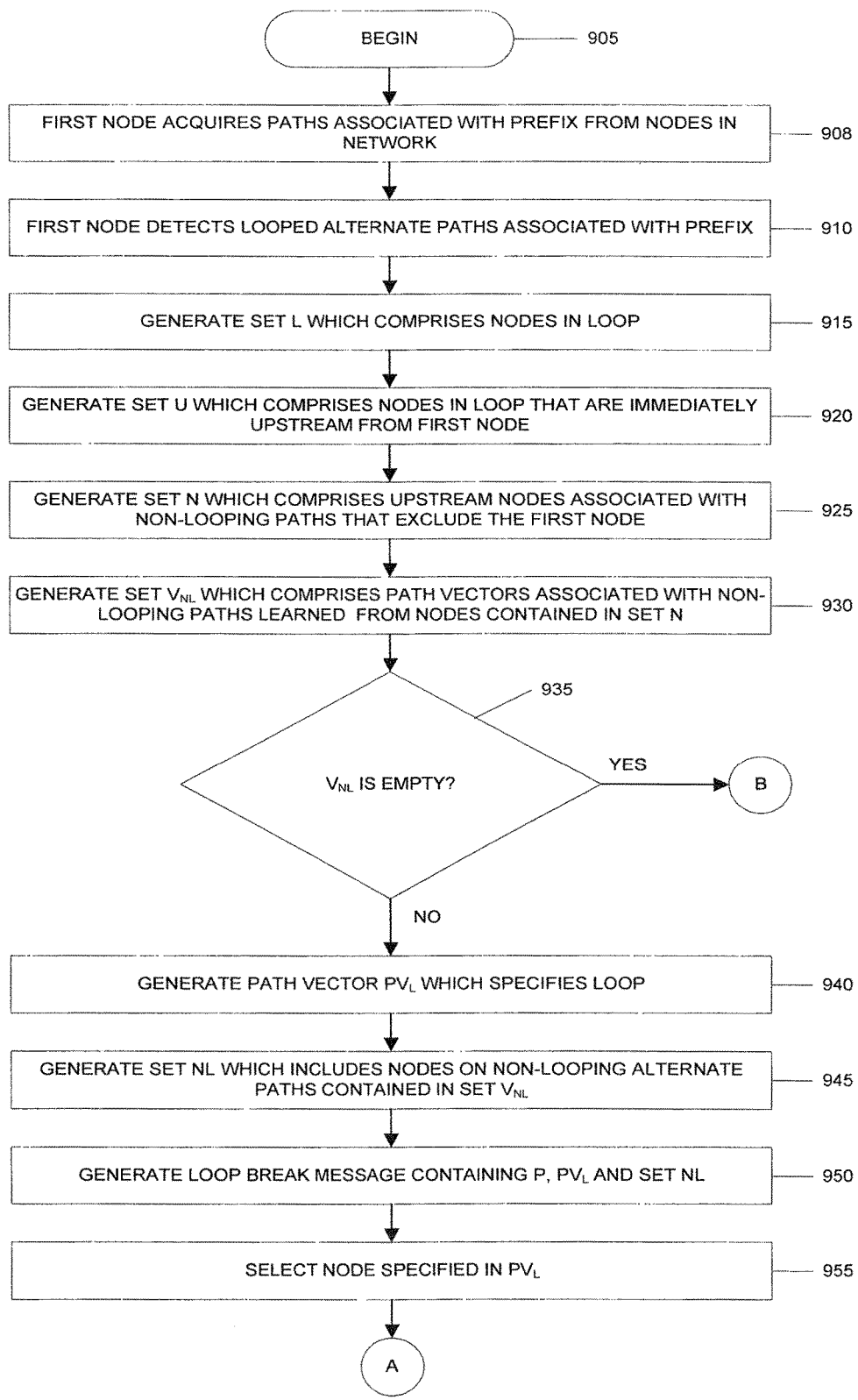
FIGS. 9A-B are a flow chart of a sequence of steps of a distributed technique that may be used in a communications network to break a loop caused by looped alternate paths associated with a prefix in the network in accordance with an aspect of the techniques described herein.
Figure 9B:
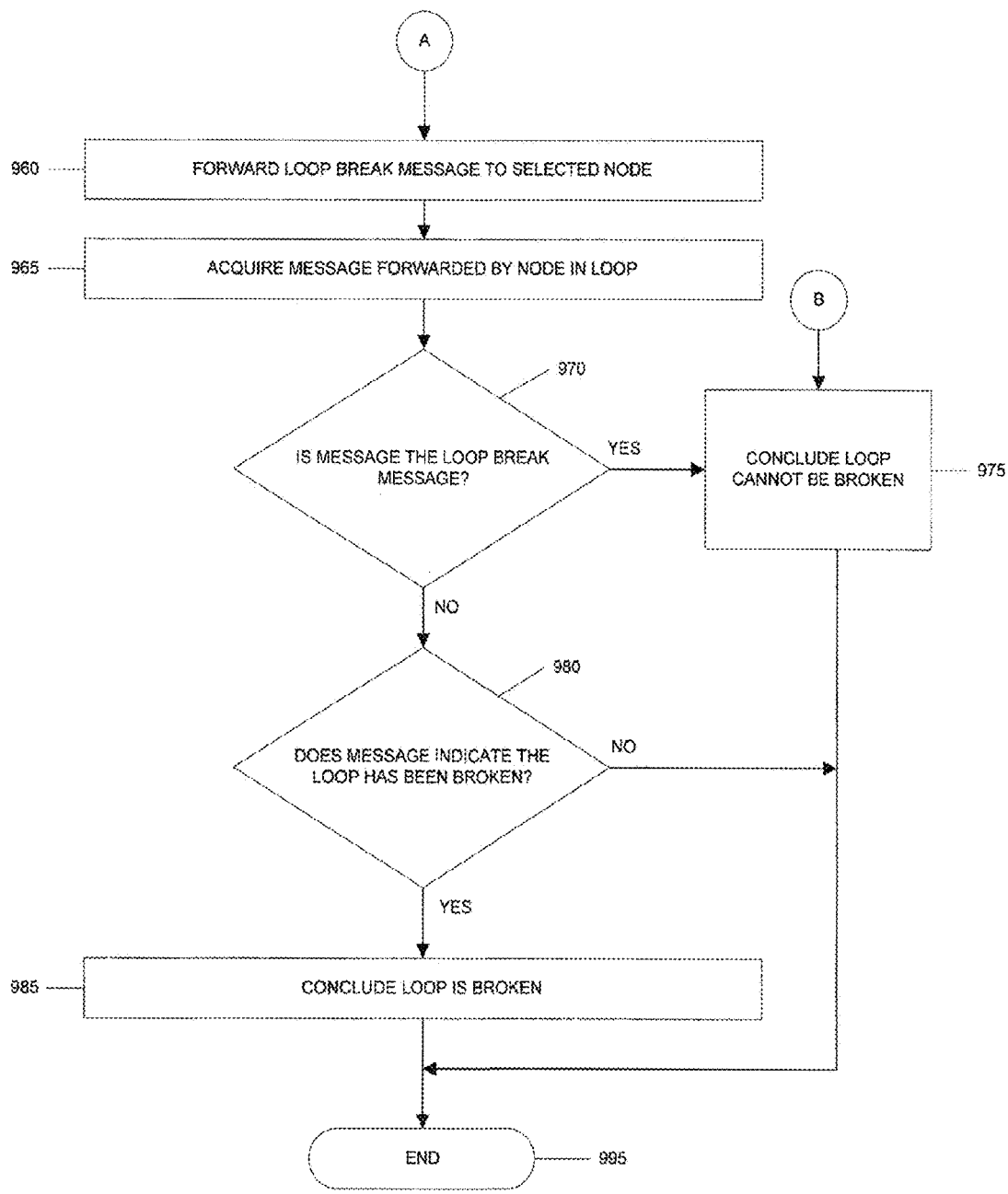

FIGS. 9A-B are a flow chart of a sequence of steps of a distributed technique that may be used in a communications network to break a loop caused by alternate paths in the network in accordance with an aspect of the techniques described herein. Assume the alternate paths are associated with a prefix "P". The sequence begins at step 905 and proceeds to step 908 wherein a first node in the communications network acquires path information associated with one or more paths that are associated with P from other nodes in the network. As noted above, these paths may include routed paths and alternate paths associated with P. In addition, as noted above, this information may be acquired from information contained in advertisement messages that are acquired by the first node from other nodes in the network. At step 915, a set L which comprises nodes on the looping path is generated. The sequence proceeds to step 920 where a set U which comprises nodes contained in the loop that are immediately upstream to the current node is generated. At step 925, a set N which comprises upstream nodes from which a path vector for an alternate path has been acquired that excludes the current node is generated. A set $V_{NL}$ comprising non-looping path vectors associated with information learned from nodes contained in set N is generated at step 930. At step 935, a check is performed to determine if set $V_{NL}$ is empty. If $V_{NL}$ is empty, the sequence proceeds to step 975 (FIG. 9B) where the first node concludes that the loop cannot be broken. The sequence then proceeds to step 995 where the sequence ends.

If at step 935 $V_{NL}$ is not empty, the sequence proceeds to step 940 where a path vector $PV_L$ comprising nodes in the loop is generated. At step 945, a set NL which includes nodes on non-looping alternate paths represented by the path vectors contained in set $V_{NL}$ is generated. A loop break message containing P, path vector $PV_L$ and set NL is generated at step 950. At step 955, a node in the path specified by path vector $PV_L$ is selected. At step 960 (FIG. 9B), the loop break message is forwarded to the selected node.

At step 965, a message forwarded by a node in the loop is acquired. At step 970, a check is performed to determine if the acquired message is the loop break message. If so, the sequence proceeds to step 975. Otherwise, if the received message is not the loop break message, the sequence proceeds to step 980 where a check is performed to determine if the message indicates that the loop has been broken. Illustratively, a message indicates the loop has been broken by including path information (e.g., a path vector) associated with an alternate path for P that has been established by a node in the loop to break the loop. If at step 980 the message does not indicate the loop has been broken, the sequence proceeds to step 995. Otherwise, if the message indicates the loop has been broken, the sequence proceeds to step 985 where the first node concludes that the loop is broken. The sequence then proceeds to step 995.

Figure 10A:
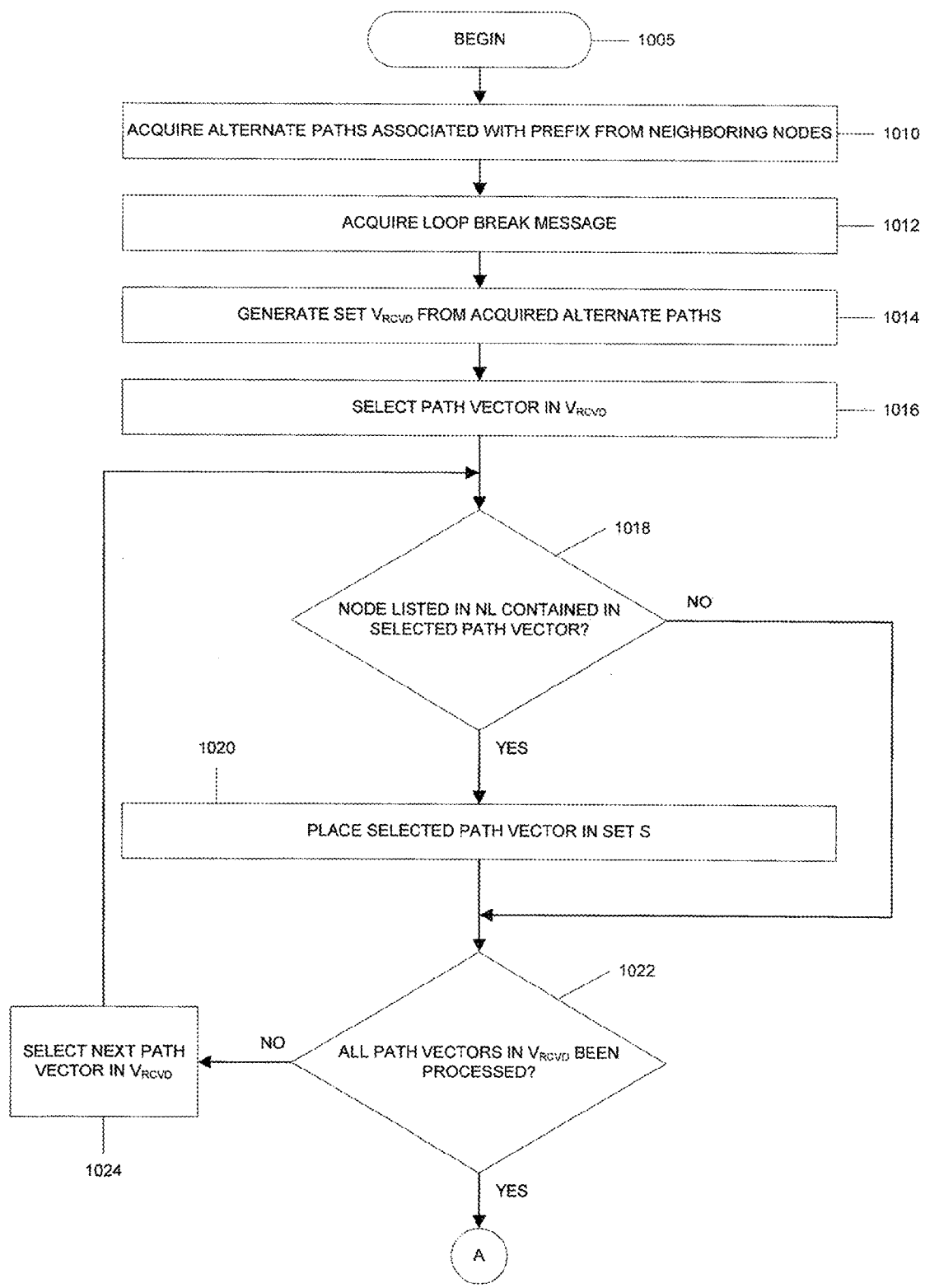
FIGS. 10A-B are a flow chart of a sequence of steps that may be used in a communications network to process a loop break message utilized in a distributed technique for breaking a loop caused by looped alternate paths associated with a prefix in accordance with an aspect of the techniques described herein.
Figure 10B:
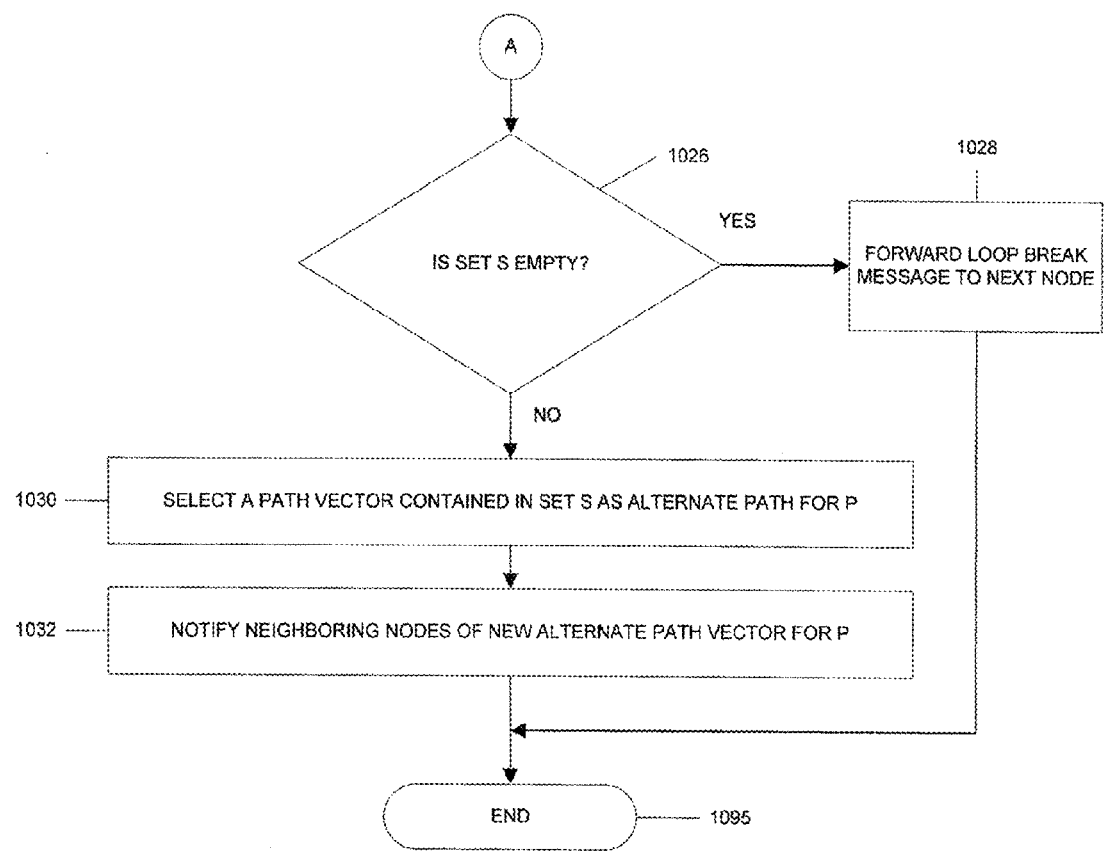

FIGS. 10A-B are a flow chart of a sequence of steps that may be used in a communications network to process the above-described loop break message at a node in the loop. The sequence begins at step 1005 and proceeds to step 1010 where one or more alternate paths associated with P are acquired from neighboring nodes. The paths may be acquired from information contained in advertisement messages, such as LDP advertisement messages, acquired from the neighboring nodes. At step 1012, the loop break message containing the set NL is acquired. At step 1014, a set $V_{RCVD}$, containing path vectors that represent the acquired alternate paths is generated. At step 1016, a path vector in $V_{RCVD}$ is selected. A check is performed, at step 1018, to determine if a node listed in set NL (e.g., contained in the acquired loop break message) is contained in the selected path vector. If not, the sequence proceeds to step 1022. Otherwise, the sequence proceeds to step 1020 where the selected path vector is placed in a set S.

At step 1022, a check is performed to determine if all of the path vectors in $V_{RCVD}$ have been processed. If not, the sequence proceeds to step 1024 where another path vector in $V_{RCVD}$ is selected. The sequence returns to step 1018. Otherwise, if at step 1022, all of the path vectors in $V_{RCVD}$ have been processed, the sequence proceeds to step 1026 (FIG. 10B) where a check is performed to determine if the set S is empty. If so, the sequence proceeds to step 1028 where the loop break message is forwarded to a next node. Illustratively, the next node is the next node listed in the path vector $PV_L$ contained in the loop break message. If there is no next node in path vector $PV_L$, the loop break message is forwarded to the first node. The sequence then proceeds to step 1095 where the sequence ends.

If at step 1026 set S is not empty, the sequence proceeds to step 1030 where a path vector contained in set S is selected as an new alternate path for P. Here, the above-described alternate path selection rule may be used to select the path vector. At step 1032, neighboring nodes are notified of the new alternate path for P. Illustratively, the neighboring nodes are notified utilizing an advertisement message, such as an LDP advertisement message. The sequence then ends at step 1095.

For example, referring to FIGS. 1, 9A-B and 10A-B, assume as above that a loop exists on alternate paths between nodes 200*b* and 200*c* for a prefix (P). Further assume that node 200*d* has acquired path information associated with P from nodes in the network (step 908) and has detected the loop (step 910), as described above. In accordance with the techniques described herein, node 200*d* generates a set L which comprises the nodes contained in the loop (step 915). Assume L is the set {200*b*, 200*a*, 200*c*}. Node 200*d* generates a set U which comprises nodes in the loop that are immediately upstream from intermediate node 200*d* (step 920). Assume U is the set {200*b*, 200*c*}. Node 200*d* generates a set N which comprises upstream nodes from which a path vector for an alternate path has been acquired that excludes intermediate node 200*d* (step 925). Assume set N is the set {200*h*}. Node 200*d* generates set $V_{NL}$ which comprises non-looping path vectors associated with information learned from nodes contained in set N (step 930). Assume set $V_{NL}$ is the set {{200*h*, 200*g*, 200*i*, 200*j*, 110*b*}}.

Node 200*d* determines if set $V_{NL}$ is empty (step 935). As noted above set $V_{NL}$ contains an element, thus, node 200*d* concludes that $V_{NL}$ is not empty. Since $V_{NL}$ is not empty, node 200*d* generates a path vector $PV_L$ comprising nodes in the loop (step 940). Assume $PV_L$ is {200*b*, 200*a*, 200*c*}. Node 200*d* generates a set NL which includes a list of nodes on non-looping alternate paths represented in set $V_{NL}$ (step 945). Assume set NL is the set (200*h*, 200*g*, 200*i*, 200*j*). Node 200*d* generates a loop break message 400 containing P, $PV_L$ and NL (step 950) in the prefix 430, path vector 440 and non-looping paths nodes 450 fields, respectively. Node 200*d* selects a node specified in path vector $PV_L$ (step 955) and forwards the loop break message to the selected node (step 960). Assume that node 200*b* is selected and that node 200*d* forwards the loop break message to node 200*b*.

Node 200*b* acquires alternate paths associated with P from neighboring nodes (step 1010). Assume the acquired alternate paths include the path {200*a*, 200*c*, 200*d*, 110*b*} from node 200*a*. Intermediate node 200*b* acquires the loop break message containing the set NL (step 1012). Node 200*b* generates set $V_{RCVD}$ from the acquired alternate paths (step 1014). Assume that set $V_{RCVD}$ is the set {{200*a*, 200*c*, 200*d*, 110*b*}}. Node 200*b* selects a path vector in $V_{RCVD}$ (step 1016) and determines if the selected path vector contains a node listed in NL (step 1018). Assume node 200*b* selects the path vector {200*a*, 200*c*, 200*d*, 110*b*} and concludes that this path vector does not contain a node listed in NL. Node 200*b* determines if there are more path vectors in $V_{RCVD}$ to process (step 1022). Since there are no more path vectors to process, node 200*b* checks set S to determine if it is empty (step 1026). Since S contains no elements (i.e., path vectors), node 200*b* concludes set S is empty and forwards the loop break message to the next node listed in the path vector field 440 (step 1028). Assume the next node is node 200*a*.

Node 200*a* acquires alternate paths associated with P from neighboring node 200*e* (step 1010). Assume the acquired paths include {200*e*, 200*f*, 200*g*, 200*h*, 200*d*, 110*b*}. Node 200*a* acquires the loop break message 400 (step 1012) and generates $V_{RCVD}$ from the acquired alternate paths, as described above (step 1014). Assume $V_{RCVD}$ is the set {{200*e*, 200*f*, 200*g*, 200*h*, 200*d*, 110*b*}}. Node 200*a* selects a path vector in $V_{RCVD}$ (step 1016). Assume the selected path vector is {200*e*, 200*f*, 200*g*, 200*h*, 200*d*, 110*b*}.

Node 200*a* determines if a node listed in NL is also contained in the selected path vector (step 1018). Assume that node 200*a* determines that node 200*h* is found in both the selected path vector and NL. Node 200*a* places the selected path vector in set S (step 1020). Assume set S is {{200*e*, 200*f*, 200*g*, 200*h*, 200*d*, 110*b*}}. Node 200*a* determines if all of the path vectors in $V_{RCVD}$ have been processed (step 1022). Assume all of the path vectors have been processed, node 200*a* checks set S, determines it is not empty (step 1028) and selects a path vector contained in set S as its alternate path vector for P (step 1030). Assume the selected path vector is {200*e*, 200*f*, 200*g*, 200*h*, 200*d*, 110*b*}. Node 200*a* notifies its neighboring nodes 200*b*, 200*c* of the new alternate path vector for prefix P. Eventually, Node 200*d* receives the notification of the new alternate path vector (step 965), verifies the notification is not the loop break message (step 970) but indicates the loop has been broken (step 980) and concludes the loop is broken (step 985).

While techniques described herein have been particularly shown and described with reference to particular aspects, it will be understood by those skilled in the art that various changes in form and details may be made therein without departing from the scope and spirit of the invention encompassed by the appended claims. As such, the foregoing described aspects are not intended to be limiting. Rather, any limitations to the claimed invention are presented in the following claims.

What is claimed is:

1. A method for breaking a loop formed from looping alternate paths associated with a prefix, the method comprising:
    identifying, with a processor at a first node, at least one non-looping alternate path associated with the prefix in response to detection of the loop at the first node, the at least one non-looping alternate path being for a second node and excluding the first node, the first and second nodes being in a communications network, the prefix being for routing of network traffic in the communications network;
    transmitting a loop break message from the first node to a third node in response to identifying the at least one non-looping alternate path for the second node at the first node, the third node being in the loop, the loop break message comprising the at least one non-looping alternate path for the second node and an identity of each node in the loop; and
    setting a non-routed path associated with the prefix at the third node that intersects the at least one non-looping alternate path as a replacement alternate path for the third node in response to receipt of the loop break message at the third node.

2. The method of claim 1 wherein transmitting the loop break message comprises transmitting the loop break message to all nodes in the loop.

3. The method of claim 1 further comprising forwarding the loop break message at each node in the loop to a next one of the nodes in the loop until a last node in the loop is reached.

4. The method of claim 1 wherein the non-routed path is neither a normal routed path for the third node nor an alternate path for the third node.

5. An apparatus that breaks a loop of looping alternate paths associated with a prefix, the apparatus comprising:
    a memory; and a processor configured to execute instructions stored in the memory, the memory comprising:

instructions executable with the processor to receive a loop break message from a first node in a communications network in response to detection of the loop at the first node, the loop break message comprising at least one non-looping alternate path associated with the prefix and an identity of each node in the loop, the at least one non-looping alternate path being for a second node, wherein the at least one non-looping alternate path is non-looping due to an exclusion of the first node, the apparatus is in the loop, and the second node is outside of the loop; and instructions executable with the processor to set a non-routed path that intersects the at least one non-looping alternate path of the second node as a replacement alternate path of the apparatus, the replacement alternate path being associated with the prefix in the memory.

6. The apparatus of claim 5, wherein the prefix is an Internet Protocol (IP) address.

7. The apparatus of claim 5, further comprising instructions executable with the processor to select the non-routed path that intersects the at least one non-looping alternate path from a plurality of non-routed paths.

8. The apparatus of claim 5, wherein the non-routed path is neither a normal routed path for the third node nor an alternate path for the third node.

9. The apparatus of claim 5, further comprising instructions executable with the processor to notify nodes neighboring the apparatus of the replacement alternate path.

10. The apparatus of claim 5, further comprising instructions executable with the processor to forward the loop break message to the first node in response to the apparatus being a last node in the loop to receive the loop break message.

11. A first node in a communications network, the first node comprising:

a network interface in communication with the communications network; and a supervisor engine configured to:

detect a loop of looping alternate paths from alternative path information received over the network interface from a plurality of nodes in the communications network;

identify at least one non-looping alternate path associated with the prefix from the alternative path information in response to detection of the loop, the at least one non-looping alternate path being for a second node in the communications network and being non-looping due to a failure to include the first node;

transmit a loop break message from the first node to a third node in response to detection of the loop at the first node, the third node being in the loop, the loop break message comprising the at least one non-looping alternate path and an identity of each node in the loop;

receive the loop break message from a last node in the loop; and determine whether the loop is broken from the loop break message.

12. The first node of claim 11 wherein the loop break message includes an indicator of whether the loop is broken.

13. The first node of claim 11 wherein the loop break message includes a replacement alternative path for at least one node in the loop to indicate the loop is broken, and the replacement alternative path intersects one of the at least one non-looping alternate path.

14. A first node in a communications network, the first node comprising:

a network interface that communicates with the communications network; and a supervisor engine comprising circuitry configured to:

detect a loop of looping alternate paths from alternate path information received over the network interface from a plurality of nodes in the communications network;

identify at least one non-looping alternate path associated with the prefix from the alternate path information in response to detection of the loop, the at least one non-looping alternate path being for a second node in the communications network and being non-looping due to a failure to include the first node;

transmit a loop break message from the first node to a third node over the network interface in response to identification of the at least one non-looping alternate path, the third node being in the loop, the loop break message comprising an identity of each node in the loop;

receive a non-routed path associated with the prefix from the third node over the network interface in response to receipt of the loop break message by the third node;

determine the non-routed path intersects the at least one non-looping alternate path; and notify the third node to set the non-routed path to a replacement alternate path for the third node.

* * * * *